(12) United States Patent
Marauska et al.

(10) Patent No.: US 10,914,611 B2
(45) Date of Patent: Feb. 9, 2021

(54) MAGNETIC FIELD SENSOR SYSTEM AND METHOD FOR ROTATION ANGLE MEASUREMENT

(71) Applicant: NXP B.V., Eindhoven (NL)

(72) Inventors: Stephan Marauska, Kaltenkirchen (DE); Edwin Schapendonk, Oss (NL); Jörg Kock, Horst (DE); Dennis Helmboldt, Halstenbek (DE); Ralf van Otten, Eindhoven (NL); Jaap Ruigrok, Asten (NL)

(73) Assignee: NXP B.V., Eindhoven (NL)

(*) Notice: Subject to any disclaimer, the term of this patent is extended or adjusted under 35 U.S.C. 154(b) by 165 days.

(21) Appl. No.: 16/113,229

(22) Filed: Aug. 27, 2018

(65) Prior Publication Data

US 2020/0064157 A1 Feb. 27, 2020

(51) Int. Cl.
*G01D 5/16* (2006.01)
(52) U.S. Cl.
CPC ..................... *G01D 5/16* (2013.01)
(58) Field of Classification Search
CPC ............................................................ G01D 5/16
See application file for complete search history.

(56) References Cited

U.S. PATENT DOCUMENTS

| 6,545,462 | B2 | 4/2003 | Schott et al. |
| 7,095,228 | B2 | 8/2006 | Steele et al. |
| 8,664,945 | B2 | 4/2014 | Laville et al. |
| 8,970,210 | B2 | 3/2015 | Masson et al. |
| 9,759,578 | B2 | 9/2017 | Haeberle et al. |
| 9,891,074 | B2 | 2/2018 | Meyer et al. |
| 2008/0186019 | A1 | 8/2008 | Hinz |
| 2012/0176070 | A1 | 7/2012 | Wallrafen |
| 2015/0185297 | A1 | 7/2015 | Zimmer et al. |
| 2015/0226581 | A1* | 8/2015 | Schott ............... G01D 5/145 324/207.2 |
| 2016/0033586 | A1 | 2/2016 | Hakenes |
| 2018/0003776 | A1* | 1/2018 | Suess ............... G01R 33/0011 |
| 2018/0135961 | A1* | 5/2018 | Vandersteegen ......... G01B 7/30 |
| 2019/0186955 | A1* | 6/2019 | Wallrafen ............ G01D 5/145 |

FOREIGN PATENT DOCUMENTS

WO    WO 2017/140495 A1    8/2017

* cited by examiner

*Primary Examiner* — Noam Reisner
(74) *Attorney, Agent, or Firm* — Charlene R. Jacobsen

(57) ABSTRACT

A system includes a magnet having an axis of rotation, the magnet being configured to produce a magnetic field. The system further includes a plurality of magnetoresistive sensor elements, each of the magnetoresistive sensor elements having a magnetic free layer configured to generate a vortex magnetization pattern in the magnetic free layer, and the magnetoresistive sensor elements being configured to produce output signals in response to the magnetic field. A rotation angle of a rotating element to which the magnet is coupled may be determined using the plurality of output signals.

18 Claims, 12 Drawing Sheets

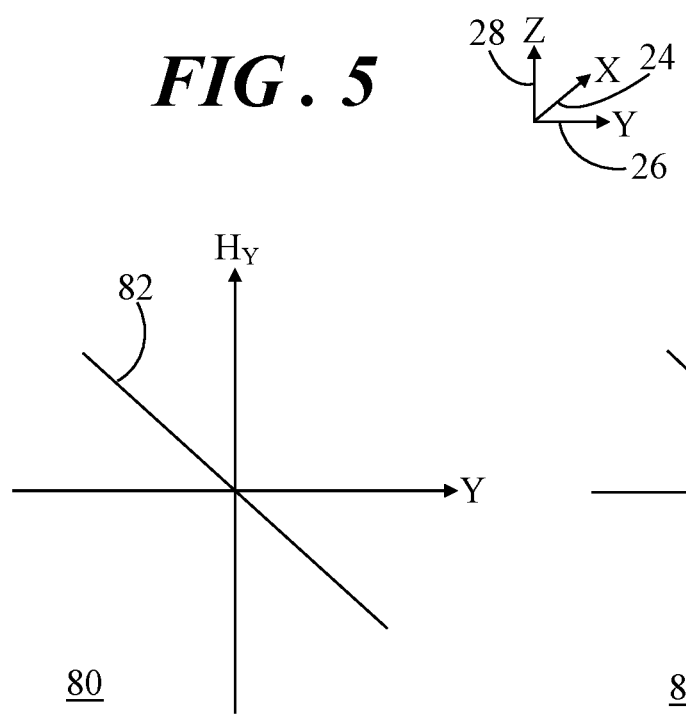
FIG. 5
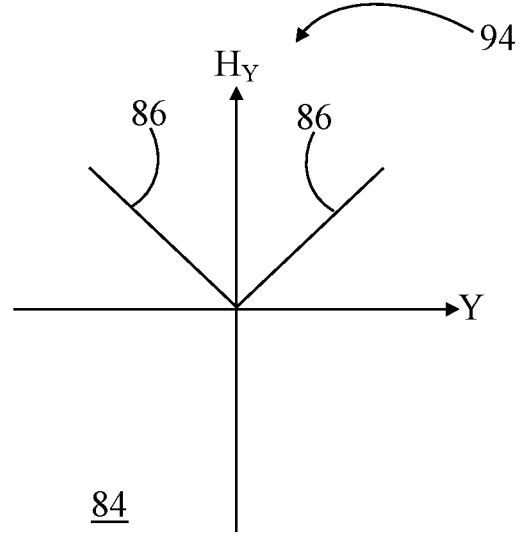
FIG. 6
FIG. 7
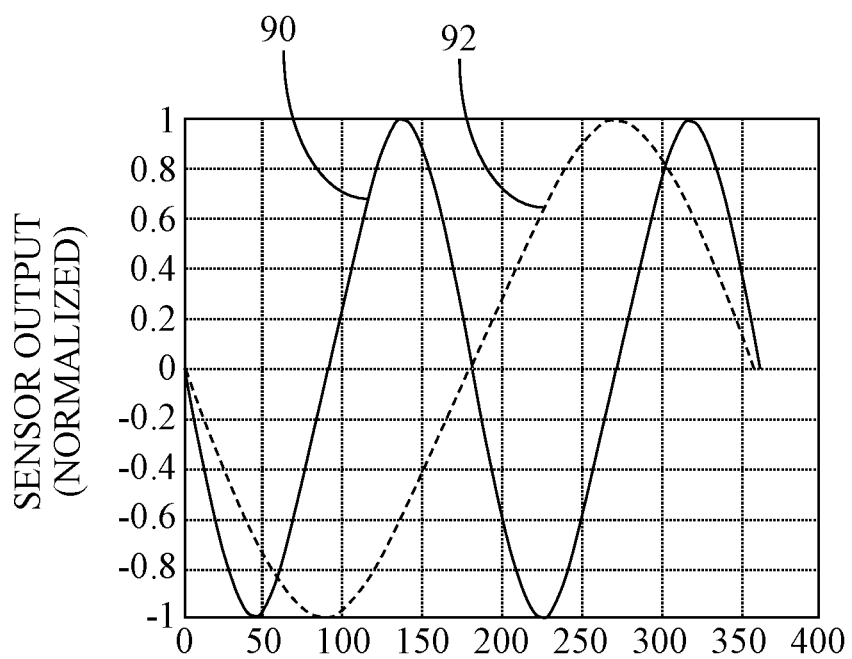

FIG. 20

| | |
|---|---|
| 0°<br>$D_{A-M1} = 8$ A.U.<br>$D_{C-M1} = 8$ A.U.<br>$D_{B-M2} = 0$ A.U.<br>$D_{D-M2} = 0$ A.U. | |
| 90°<br>$D_{A-M1} = 0$ A.U.<br>$D_{C-M1} = 0$ A.U.<br>$D_{B-M2} = 8$ A.U.<br>$D_{D-M2} = 8$ A.U. | |
| 180°<br>$D_{A-M1} = -8$ A.U.<br>$D_{C-M1} = -8$ A.U.<br>$D_{B-M2} = 0$ A.U.<br>$D_{D-M2} = 0$ A.U. | |
| 270°<br>$D_{A-M1} = 0$ A.U.<br>$D_{C-M1} = 0$ A.U.<br>$D_{B-M2} = -8$ A.U.<br>$D_{D-M2} = -8$ A.U. | |

214

MAGNETIC FIELD SENSOR SYSTEM AND METHOD FOR ROTATION ANGLE MEASUREMENT

TECHNICAL FIELD OF THE INVENTION

The present invention relates generally to magnetic field sensor systems. More specifically, the present invention relates to systems incorporating magnetoresistive sensors with their free layers in a vortex domain state for rotation angle measurement.

BACKGROUND OF THE INVENTION

Angular sensors, for measuring a rotation angle or angular position, are implemented in a wide array of automotive and industrial applications. For example, in the automotive industry, angular sensors may be used for valve control, pedal position sensing, steering wheel position sensing, throttle position sensing, motor-shaft position sensing, and multiple other uses. Typically, magnetic field sensors are preferred because their contactless measurement makes them immune to mechanical wear. In these applications, a change in the direction of the magnetic field of a magnet mounted on the moving part, is measured. The magnetic field is not hindered by debris and other non-magnetic materials. Some magnetic field sensors are based upon the magnetoresistive effect in which a material has a tendency to change the value of its electrical resistance in response to an externally-applied magnetic field. Magnetoresistive devices include, for example, Anisotropic Magneto Resistance (AMR) technology, Giant Magneto Resistance (GMR) technology, Tunnel Magneto Resistance (TMR) technology, and so forth.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

FIG. 5 shows a graph of a magnetic field distribution for an encoder magnet having linear dependence in a Y-direction;

FIG. 6 shows a graph of a magnetic field distribution for an encoder magnet having mirror symmetry in both positive and negative Y-directions;

FIG. 7 shows a graph of normalized and idealized output signals of the vortex domain state TMR sensor of FIG. 3 in response to encoder magnets with the magnetic field distributions of FIGS. 5 and 6;

FIG. 20 shows a chart depicting the sensor die of FIG. 14 in the presence of an encoder magnet having the linear magnetic field distribution of FIG. 5;

DETAILED DESCRIPTION

In overview, the present disclosure concerns a system and methodology for measuring angular rotation of an object. More particularly, a system includes multiple magnetoresistive sensor elements, such as tunnel magnetoresistive (TMR) sensor elements, arranged in a gradient magnetic field sensing configuration. The free layers of the TMR sensor elements are configured in a vortex domain state and are thus sensitive to in-plane magnetic fields along a single axis. A gradient bridge configuration of TMR sensor elements and the single axis sensitivity of the vortex domain state of the TMR sensor elements can enable the suppression of the effect of homogeneous stray magnetic fields in an angular sensor application. Further, a system may include an encoder magnet magnetized to produce a V-well shaped magnetic field distribution to further differentiate the magnetic field signal of the encoder magnet from the homogeneous stray fields in order to yield highly accurate angular measurements over a 360° measurement range. Additionally, various arrangements of TMR sensor elements may further yield multiple differential signals for improved accuracy and robustness to mechanical offset.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions. Furthermore, some of the figures may be illustrated using various shading and/or hatching to distinguish the different elements produced within the various structural layers. These different elements within the structural layers may be produced utilizing current and upcoming microfabrication techniques of depositing, patterning, etching, and so forth. Accordingly, although different shading and/or hatching is utilized in the illustrations, the different elements within the structural layers may be formed out of the same material.

Figure 1:
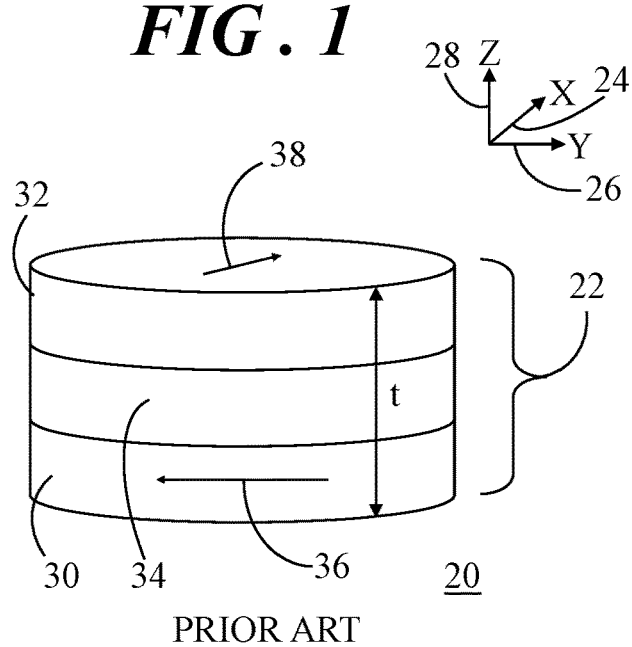
FIG. 1 shows a simplified perspective view of a tunnel magnetoresistive (TMR) sensor element having a single domain state.

Referring to FIG. 1, FIG. 1 shows a simplified perspective view of a prior art tunnel magnetoresistive (TMR) sensor element 20 having a single domain state. TMR sensor element 20 typically includes a layer stack 22 of alternating ferromagnetic and non-ferromagnetic layers arranged on a common substrate (not shown). Within a Cartesian coordinate system with an X-axis 24, a Y-axis 26, and a Z-axis 28, the layers of layer stack 22 extend in a plane spanned by X- and Y-axes 24, 26. The extent of layer stack 22 along Z-axis 28 may be described as the layer thickness, t.

A TMR structure typically includes a metal-insulator-metal layer sandwich, (e.g., layer stack 22), in which the metal layers are magnetic and the insulator layer is very thin. In this example, layer stack 22 of TMR sensor element 20 includes magnetic layers 30, 32 separated by an electrically insulating tunnel barrier layer 34. Magnetic layer 30 may be fixed, or "pinned," to have a reference magnetization, as represented by an arrow 36. Therefore, ferromagnetic layer 30 is referred to hereinafter as pinned layer 30. Magnetic layer 32 is "free" to respond to, i.e., sense, an applied magnetic field to provide a sense magnetization, represented by an arrow 38. Accordingly, magnetic layer 32 is referred to hereinafter as free layer 32. The single domain state configuration of TMR sensor element 20 has homogeneous in-plane magnetization, with an orthogonal configuration between pinned and free layers 30, 32.

While in operation, electrical charges may pass from one side of tunnel barrier layer 34 to the other in a predetermined amount when a constant external magnetic field is applied. The TMR effect expresses itself as a change of the amount of charges passing through tunnel barrier layer 34 when the direction of the external magnetic field changes. This effect may arise due to directional changes of the magnetization of free layer 32 caused by the changing external magnetic field.

Figure 2:
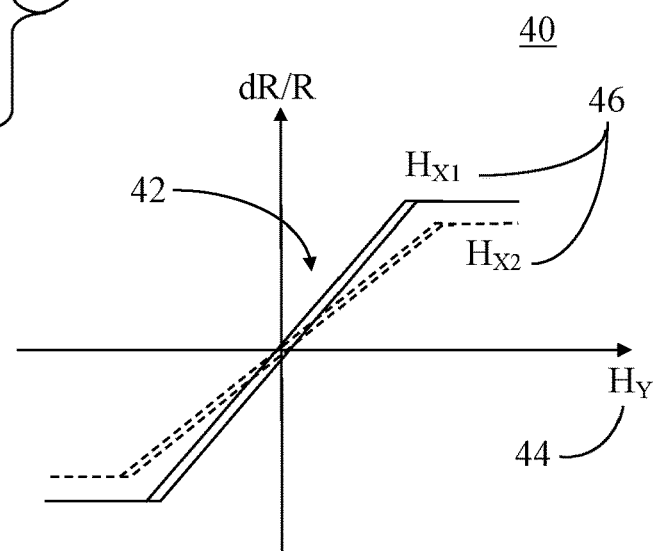
FIG. 2 shows a graph of a magnetoresistive transfer curve in dependence of magnetic field strength for the single domain state of the TMR sensor element of FIG. 1.

FIG. 2 shows a graph 40 of a magnetoresistive transfer curve 42 of magnetic field strength 44, $H_Y$, for the single domain state of the TMR sensor element 20 (FIG. 1). Transfer curve 42 shows a linear response with minor hysteresis. However, magnetic field strength 44, $H_Y$, depends upon the cross-axis magnetic field strength 46, $H_{X1}$ or $H_{X2}$, in this example.

Figure 3:
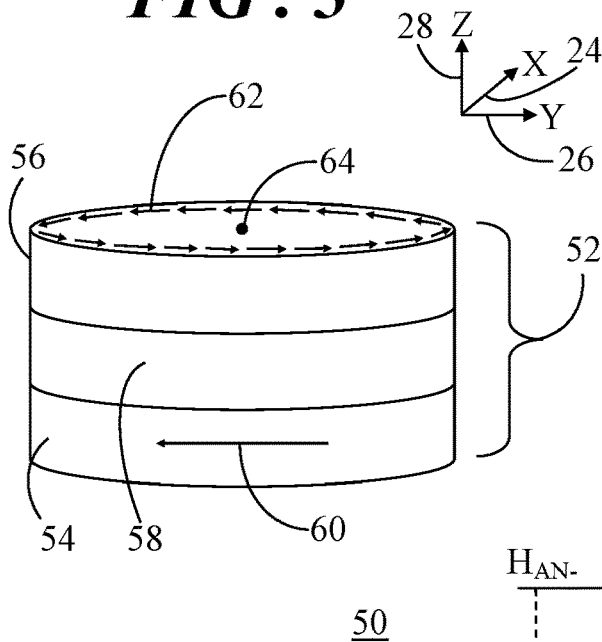
FIG. 3 shows a simplified perspective view of a TMR sensor element having a vortex domain state.

Referring now to FIG. 3, FIG. 3 shows a simplified perspective view of a TMR sensor element 50 having a vortex domain state. TMR sensor element 50 includes a layer stack 52 that includes a magnetic pinned layer 54 and a magnetic free layer 56 separated by an electrically insulating tunnel barrier layer 58. Again, pinned layer 54 is fixed, or "pinned," to have a reference magnetization, as represented by an arrow 60. Magnetic free layer 56 is a rotationally symmetric circular or disk-like shape. Providing free layer 56 having a rotationally symmetric shape may lead to formation of a closed flux magnetization pattern in free layer 56. This closed flux magnetization pattern may include a vortex magnetization pattern, where the vortex magnetization pattern may be essentially circular. In this example of the vortex domain state, magnetic free layer 56 has a vortex magnetization pattern 62 in which the magnetization is characterized by a circumferential (e.g., circular) pattern and a center point 64 at which the magnetization direction points outward or inward relative to Z-axis 28.

Although a TMR sensor element is discussed herein, those skilled in the art will recognize that vortex structures are not limited to the TMR effect. Alternative embodiments may implement Giant Magnetoresistive (GMR) sensor structures, Anisotropic Magnetoresistive (AMR) sensor structures, or other xMR structures.

Figure 4:
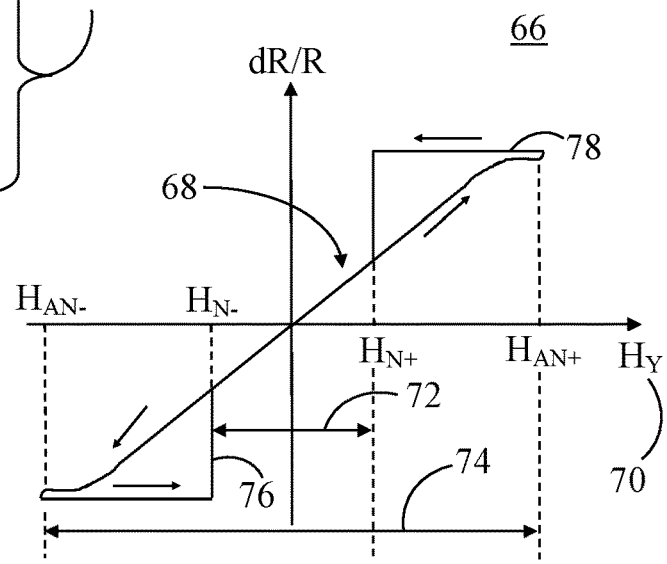
FIG. 4 shows a graph of a magnetoresistive transfer curve in dependence of magnetic field strength for the vortex domain state of the TMR sensor element of FIG. 3.

FIG. 4 shows a graph 66 of a magnetoresistive transfer curve 68 in dependence of magnetic field strength 70, $H_Y$, for the vortex domain state of TMR sensor element 50 (FIG. 3). Transfer curve 66 shows no cross-axis dependency. That is, magnetic field strength 70, $H_Y$, is not affected by the cross-axis magnetic field strength, $H_X$. Critical parameters which may describe a condition in which the vortex domain state exists are nucleation field, $H_N$, where the vortex nucleates, and annihilation field, $H_{AN}$, where the vortex vanishes and gets destroyed again, respectively. Graph 66 further shows these vortex characteristics, i.e., nucleation field, $H_N$, and annihilation field, $H_{AN}$.

Two different working ranges may be distinguished with respect to nucleation field, $H_N$, and annihilation field, $H_{AN}$. A first working range, referred to herein as a vortex formation range 72 is defined by the nucleation fields $H_{N+}$ and $H_{N-}$, and may be unaffected by the magnetic history since vortex nucleation may be ensured. A second working range, referred to herein as a vortex annihilation range 74 is defined by the annihilation fields $H_{AN+}$ and $H_{AN-}$. As long as vortex annihilation range 74 is not exceeded (for example, by a disturbance event, such as a high magnetic field pulse), the vortex state may be preserved. In other words, the in-plane component of the magnetization, dR/R, may be shifted along curve 68 by altering the external magnetic field. However, after a disturbance event occurs outside of vortex annihilation range 74, a "reset" may be needed in order to re-form the vortex magnetization pattern 62 (FIG. 3) by reducing the external magnetic field strength to a value within vortex formation range 72. In between the disturbance event and vortex reformation, the in-plane component of the magnetization, dR/R, may follow a hysteresis curve 76, 78. Thus, for relatively low external magnetic fields, there may be nearly zero hysteresis. However, for high external magnetic fields, a strong hysteresis occurs due to annihilation (at $H_{AN}$) and nucleation (at $H_N$) of the vortex core. As a consequence, the external magnetic fields should ideally be below the annihilation field to ensure proper operation in an application.

In accordance with embodiments described below, systems include multiple magnetoresistive sensor elements, such as TMR sensor elements 50, each of which includes magnetic free layer 56 configured to generate vortex magnetization pattern 62 in magnetic free layer 56 and each of which is configured to produce output signal in response to a magnetic field. This magnetic field is produced by an encoder magnet also described in detail below. Vortex domain state magnetoresistive sensor elements (e.g., TMR sensor element 50) may be suitable candidates for use as magnetic gradiometers, due to their insensitivity to cross-axis magnetic fields and their highly linear response over a wide adjustable magnetic field range.

Referring now to FIGS. 5-7, FIG. 5 shows a graph 80 of a magnetic field distribution 82, $H_Y$, for an encoder magnet having linear dependence in a Y-direction corresponding to Y-axis 26. FIG. 6 shows a graph 84 of a magnetic field distribution 86, $H_Y$, for an encoder magnet having mirror symmetry in both positive and negative Y-directions corresponding to Y-axis 26. And, FIG. 7 shows a graph 88 of normalized and idealized output signals 90, 92 of the vortex domain state TMR sensor 50 (FIG. 3) in response to encoder magnets with the magnetic field distributions 82, 86 (FIGS. 5 and 6). As shown, magnetic field distribution 82 of graph 80 has linear dependence in the Y-direction. In contrast, magnetic field distribution 86 of graph 84 is mirror symmetric, but behaves linearly in both the positive and negative Y-directions. This mirror symmetric magnetic field distribution 86 is referred to herein as a V-well shaped magnetic field distribution 94.

Output signal 90 of graph 88 represents the output of TMR sensor element 50 in the presence of an encoder magnet having linear magnetic field distribution 82. Output signal 90 has double periodicity and therefore yields a 180° angular measurement range. Output signal 92 of graph 88 represents the output of TMR sensor element 50 in the presence of an encoder magnet having V-well shaped magnetic field distribution 94. Output signal 92 has a single period and therefore a unique 360° dependency. Accordingly, a 360° angular measurement range can be achieved using TMR sensor elements 50 and an encoder magnet having V-well shaped magnetic field distribution 94.

Figure 8:
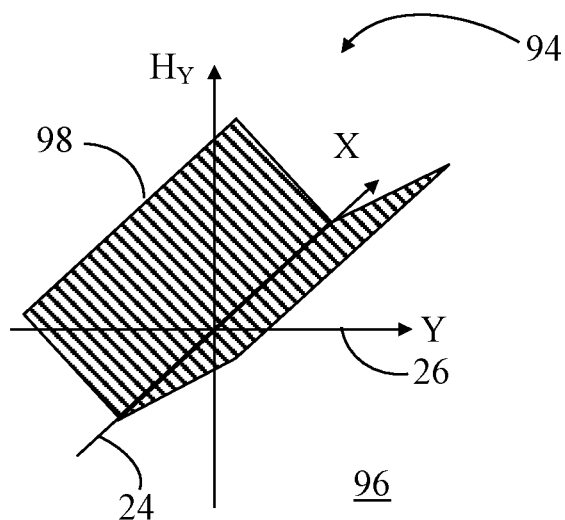
FIG. 8 shows a two-dimensional idealized schematic of the in-plane magnetic field distribution of the $H_Y$ magnetic field component corresponding to the magnetic field distribution of FIG. 6.
Figure 9:
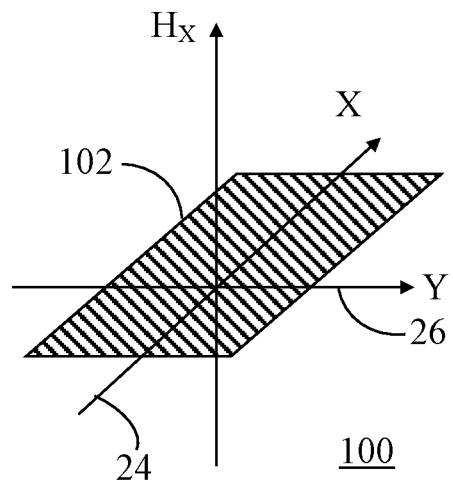
FIG. 9 shows a two-dimensional idealized schematic of the in-plane magnetic field distribution of the $H_X$ magnetic field component corresponding to the magnetic field distribution of FIG. 6.
Figure 10:
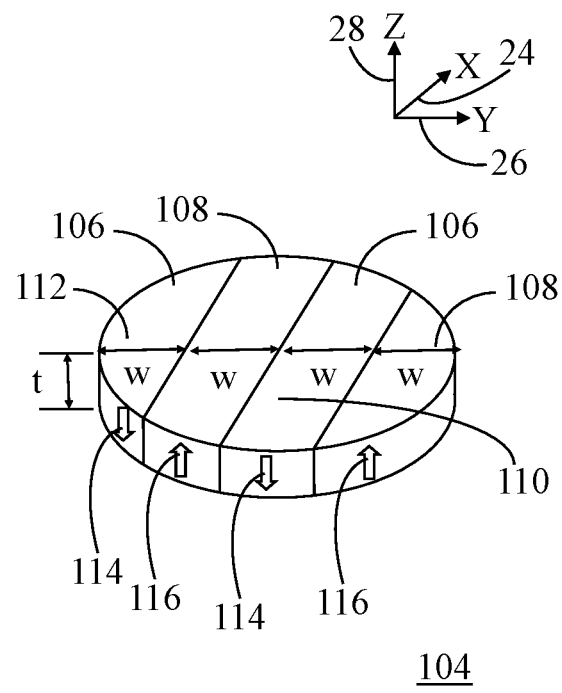
FIG. 10 shows a perspective view of a circular encoder magnet configured to generate a V-well shaped magnetic field distribution depicted in FIGS. 6 and 8.
Figure 11:
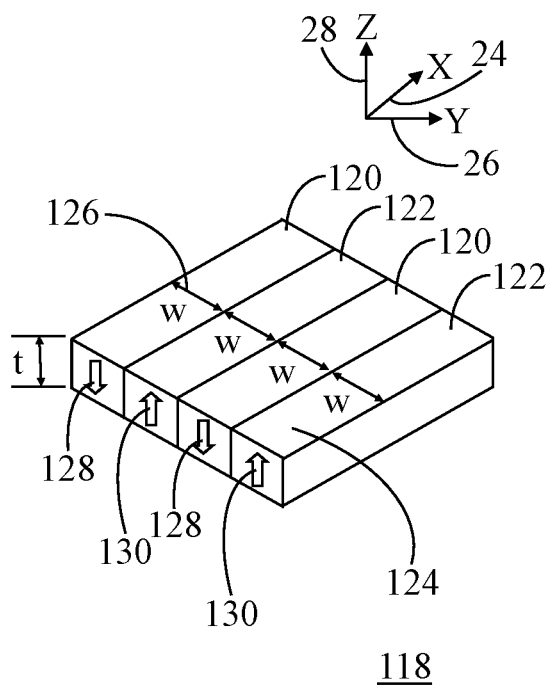
FIG. 11 shows a perspective view of a rectangular encoder magnet configured to generate the V-well shaped magnetic field distribution depicted in FIGS. 6 and 8.

With reference to FIGS. 8-9, FIG. 8 shows a two-dimensional idealized schematic 96 of a first in-plane magnetic field distribution of an $H_Y$ magnetic field component 98 corresponding to V-well shaped magnetic field distribution 94 (FIG. 6) and FIG. 9 shows a two-dimensional idealized schematic 100 of a second in-plane magnetic field distribution of an $H_X$ magnetic field component 102 corresponding to V-well shaped magnetic field distribution 94. The plot in FIG. 9 is a cross-section of the plot of FIG. 8 along Y-axis 26. In this example, $H_Y$ magnetic field component 98 forms V-well shaped magnetic field distribution 94 that is generally zero at a position Y=0 and increases linearly in the positive and negative Y-directions corresponding to Y-axis 26. In contrast, $H_X$ magnetic field component 102 is constant. FIGS. 10-11, discussed below, provide examples of encoder magnets that may effectively yield V-well shaped magnetic field distribution 94 of $H_Y$ magnetic field component 98 and the constant magnetic field distribution of $H_X$ magnetic field component 102.

FIG. 10 shows a perspective view of a circular encoder magnet 104 configured to generate V-well shaped magnetic field distribution 94 depicted in FIGS. 6 and 8. Circular encoder magnet 104 includes alternating first and second linear sections 106, 108. First and second linear sections 106, 108 are oriented in a single direction relative to a surface 110 of circular encoder magnet 104. That is, the boundaries between each of first and second linear sections 106, 108 are aligned parallel to one another and arranged, in this example, parallel to X-axis 24. Each of first and second linear sections 106, 108 has the same thickness, t, and the same width, w, at its center region 112. However, other embodiments with varying thickness, t, and width, w, may be implemented.

First linear sections 106 have a first magnetic field direction, represented by arrows 114, that is oriented perpendicular to surface 110 of circular encoder magnet 104. Similarly, second linear sections 108 have a second magnetic field direction, represented by arrows 116, that is also oriented perpendicular to surface 110 of circular encoder magnet 104. However, first and second magnetic field directions 114, 116 are directed (i.e., pointed) opposite one another. The same thickness, t, and width, w, as well as the alternating first and second magnetic field directions 114, 116 yields the symmetric V-well shaped magnetic field distribution 94 of $H_Y$ magnetic field component 98, depicted in FIGS. 6 and 8, with the generally constant $H_X$ magnetic field component 102 depicted in FIG. 9.

FIG. 11 shows a perspective view of a rectangular encoder magnet 118 configured to generate V-well shaped magnetic field distribution 94 depicted in FIGS. 6 and 8. Rectangular encoder magnet 118 also includes alternating first and second linear sections 120, 122. First and second linear sections 120, 122 are oriented in a single direction relative to a surface 124 of rectangular encoder magnet 118, such that the boundaries between each of first and second linear sections 120, 122 are aligned parallel to one another and arranged, in this example, parallel to X-axis 24. Each of first and second linear sections 120, 122 has the same thickness, t, and the same width, w, at its center region 126. However, other embodiments with varying thickness, t, and width, w, may be implemented.

Again, first linear sections 120 have a first magnetic field direction, represented by arrows 128, that is oriented perpendicular to surface 124 of rectangular encoder magnet 118. Similarly, second linear sections 122 have a second magnetic field direction, represented by arrows 130, that is also oriented perpendicular to surface 124 of rectangular encoder magnet 118. However, first and second magnetic field direction 128, 130 are directed (i.e., pointed) opposite one another. Like circular magnetic encoder magnet 104, the same thickness, t, and width, w, as well as the alternating first and second magnetic field directions 128, 130 yields the symmetric V-well shaped magnetic field distribution 94 of $H_Y$ magnetic field component 98, depicted in FIGS. 6 and 8, with the generally constant $H_X$ magnetic field component 102 depicted in FIG. 9.

Although circular and rectangular encoder magnets are shown herein, in alternative embodiments, an encoder magnet may have a different shape that is capable of producing V-well shaped magnetic field distribution 94. Further, in the illustrated example configurations, each of circular and rectangular encoder magnets 104, 118 includes a total of four linear sections as a compromise to magnet complexity, gradient field strength, and offset robustness. However, in alternative embodiments, an encoder magnet having any even number of linear magnetic sections may be capable of producing V-well shaped magnetic field distribution 94.

Figure 12:
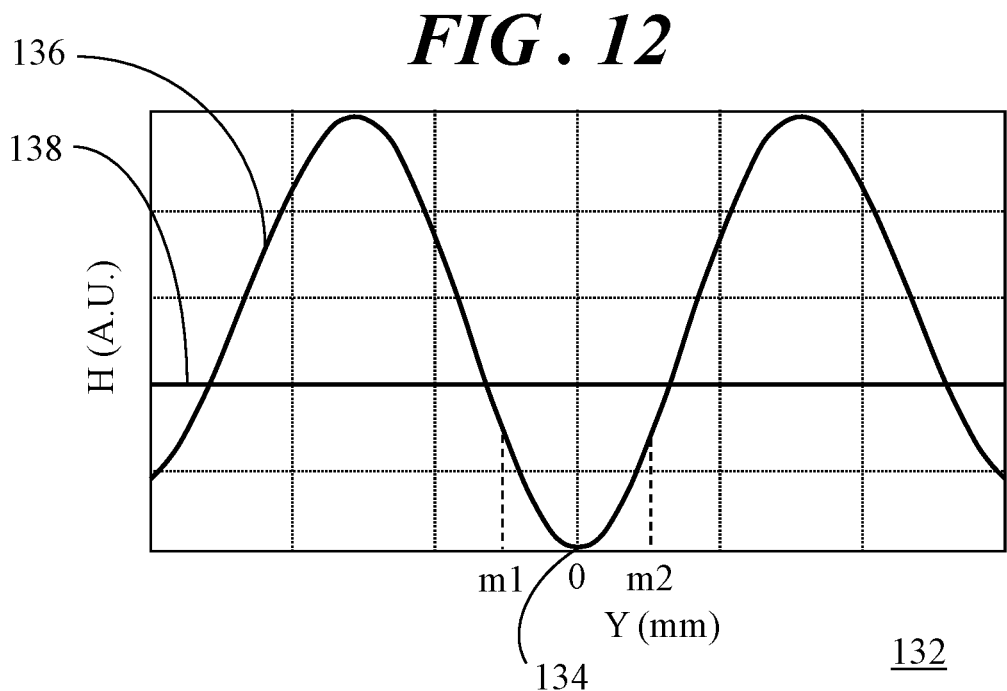
FIG. 12 shows a graph of a magnetic field from the circular encoder magnet of FIG. 10.

FIG. 12 shows a graph 132 of the magnetic field from magnet 104 (FIG. 10) along the y-axis at the x center position of magnet 104. A V-well shaped curve magnetic field distribution, similar to V-well shaped curve magnetic field distribution 94 (FIG. 8) exists around a center position 134 relative to Y-axis 26. Graph 132 depicts an example of an $H_Y$ magnetic field component 136 having V-well shaped curve magnetic field distribution 94 and an $H_X$ magnetic field component 138 that is nearly constant for rectangular encoder magnet 118 (FIG. 11). In this example, center position 134 of $H_Y$ magnetic field component 136 may be located at, for example, Y=0 mm. In other configurations, center position 134 of $H_Y$ magnetic field component 136 may be offset from Y=0 mm.

Figure 13:
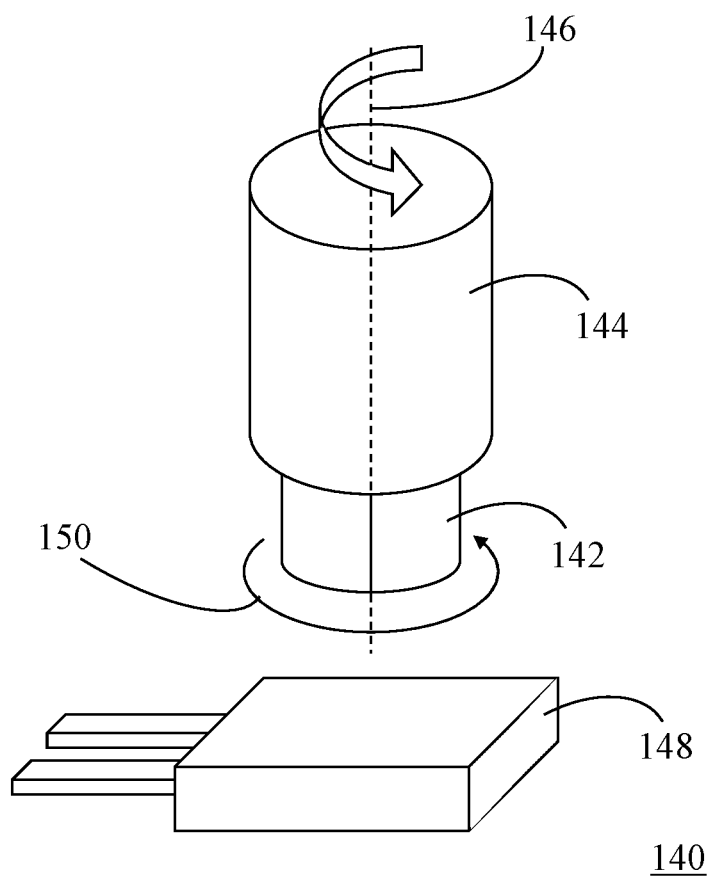
FIG. 13 shows in a simplified and representative form an example of a system for angular position measurement.

Referring to FIG. 13, FIG. 13 shows in a simplified and representative form an example of a system 140 for angular position measurement. In this example, an encoder magnet 142 is mounted onto a rotating element, such as a shaft 144, that is configured to rotate about an axis of rotation 146. Shaft 144 may be implemented as a component of a motor (not shown). A packaged magnetic field sensor 148 may be located in proximity to encoder magnet 142. In general, as shaft 144 rotates, a rotating magnetic field 150 of encoder magnet 142 correlates with the angular position of shaft 144, and thus of the motor. Packaged magnetic field sensor 148 is configured to measure the direction of rotating magnetic field 150 of encoder magnet 142 so that the angular position of shaft 144 may be determined.

In accordance with configurations discussed below, packaged magnetic field sensor 148 includes a plurality of magnetoresistive sensor elements, such as TMR sensor element 50 (FIG. 3), each of which has magnetic free layer 56 (FIG. 3) configured to generate vortex magnetization pattern 62 (FIG. 3) in magnetic free layer 56, the magnetoresistive sensor elements being configured to produce output signals in response to magnetic field 150. The magnetoresistive sensor elements can be utilized in a gradiometer sensor configuration (described below) and the output signals can be suitably processed such that the effect of homogeneous stray magnetic fields can be effectively cancelled. In some embodiments, inclusion of an encoder magnet (e.g., circular encoder magnet 104 of FIG. 10 or rectangular encoder magnet 118 of FIG. 11) having V-well shaped magnetic field distribution 94 (FIGS. 6 and 8) and having constant magnetic field distribution 102 (FIG. 9) may be implemented as encoder magnet 142 within system 140 to enable a rotation angle measurement range of 0-360° about axis of rotation 146.

Figure 14:
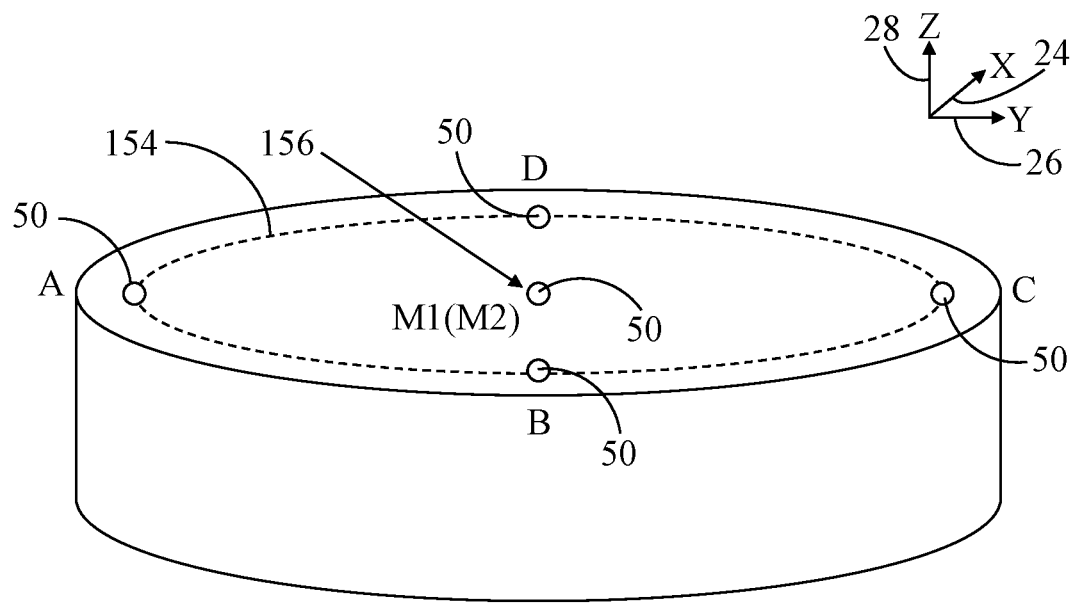
FIG. 14 shows a simplified perspective view of a sensor die having a plurality of TMR sensor elements in accordance with an embodiment.
Figure 15:
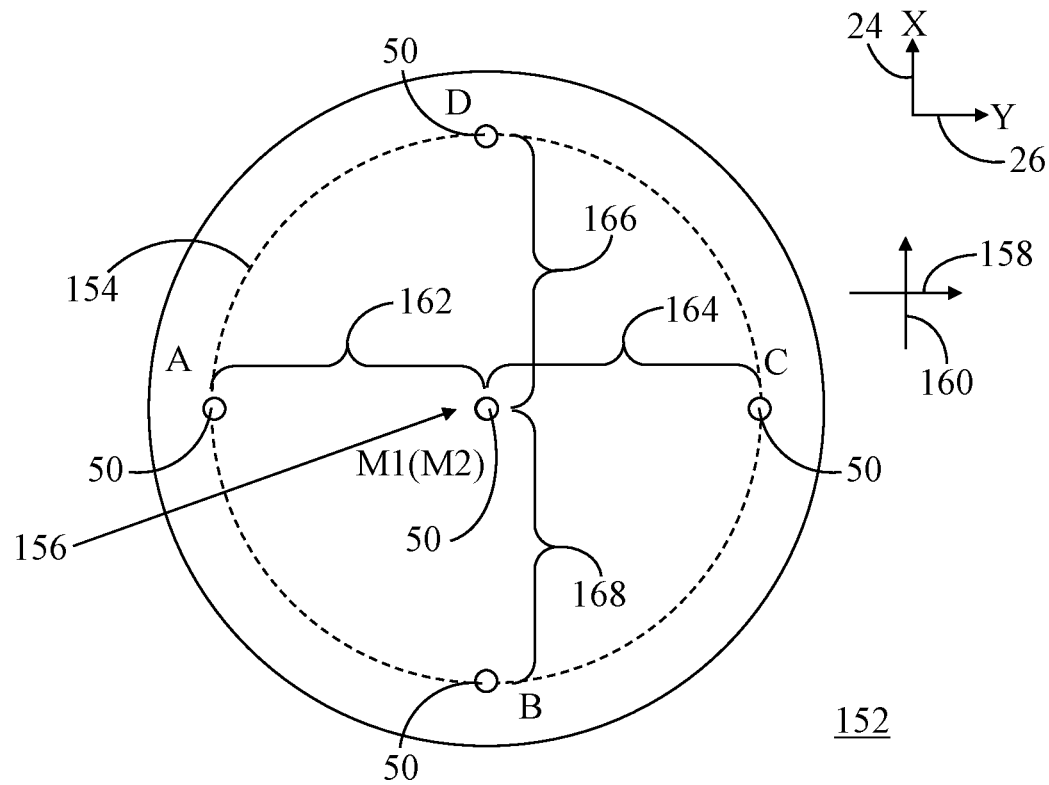
FIG. 15 shows a top view of the sensor die of FIG. 14.

Referring to FIGS. 14-15, FIG. 14 shows a simplified perspective view of a sensor die 152 having a plurality of TMR sensor elements 50 in accordance with an embodiment and FIG. 15 shows a top view of sensor die 152. Sensor die 152 may be incorporated in packaged magnetic field sensor 148 (FIG. 13) of angular position measurement system 140 (FIG. 13). TMR sensor elements 50 fabricated on or in sensor die 152 include first, second, third, and fourth TMR sensor elements 50, individually distinguished by the letters A, B, C, and D, arranged at four locations along a circular path 154 that is generally centered about axis of rotation 146 and has a center position 156. In some embodiments, first, second, third, and fourth TMR sensor elements (e.g., A, B, C, D) are equally spaced apart from one another by 90° along circular path 154. First and third TMR sensor elements 50 (e.g., A and C) diametrically oppose one another along circular path 154 and second and fourth TMR sensor elements 50 (e.g., B and D) diametrically oppose one another along circular path 154. Thus, FIGS. 14 and 15 demonstrate a cross-type configuration of TMR sensor elements 50.

The TMR sensor elements 50 of sensor die 152 further include fifth and sixth TMR sensor elements 50, individually distinguished by M1 and M2, arranged at center position 156 of circular path 154. For simplicity, fifth and sixth TMR sensor elements 50 are represented at center position 156 by a single dot. However, as will be discussed below in connection with FIGS. 16-19, fifth and sixth TMR sensor elements 50 may be located at center position 156 by adjacent placement, interleaving, and/or stacking. Additionally, each of TMR sensor element 50 (e.g., A, B, C, D, M1, M2) may be a single sensor dot, or they may be an array that may include multiple single sensor elements and dots, respectively.

As discussed above, TMR sensor elements 50 are uniaxially sensitive. That is, due to their vortex magnetization pattern 62 (FIG. 3), TMR sensor elements 50 are sensitive along a single axis. In the illustrated example, first, third, and fifth TMR sensor elements 50 (e.g., A, C, M1) have a first sensitive axis 158 (denoted by an arrow directed in a positive sensing direction aligned with Y-axis 26 in FIG. 15) and second, fourth, and sixth TMR sensor elements 50 (e.g., B, D, M2) have a second sensitive axis 160 (denoted by an arrow directed in a positive sensing direction aligned with X-axis 24 in FIG. 15). First and second sensitive axes 158, 160 are in-plane axes (e.g., aligned with Y- and X-axes 26, 24 respectively) and are orthogonal to one another in this configuration.

In an embodiment, first and fifth TMR sensor elements 50 (e.g., A and M1) form a first gradient unit 162. Third and fifth TMR sensor elements 50 (e.g., C and M1) form a second gradient unit 164. Second and sixth TMR sensor elements 50 (e.g., B and M2) form a third gradient unit 166. And, fourth and sixth TMR sensor elements 50 (e.g., D and M2) form a fourth gradient unit 168.

Figure 16:
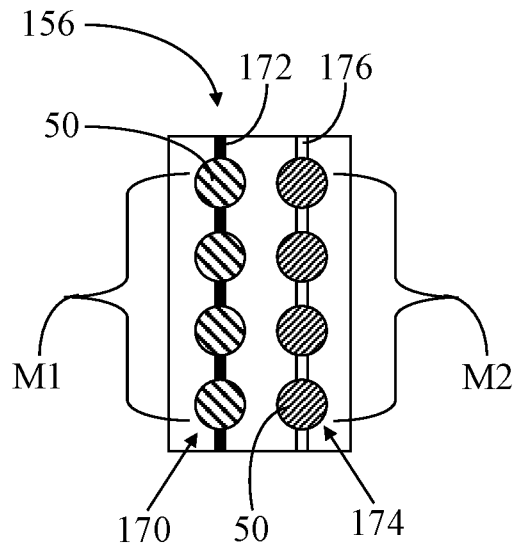
FIG. 16 shows a simplified top view of an arrangement of TMR sensor elements that may be located at a center position of the sensor die of FIG. 14 in accordance with an embodiment.

FIG. 16 shows a simplified top view of an arrangement of TMR sensor elements 50 that may be located at center position 156 of sensor die 152 (FIG. 14) in accordance with an embodiment. In particular, TMR sensor elements 50 (represented by wide hatching) of a first array 170 of sensor elements are suitably electrically interconnected via a conductive trace 172 to form fifth TMR sensor element 50 (M1) and TMR sensor elements 50 (represented by narrow hatching) of a second array 174 of sensor elements are suitably electrically interconnected via a conductive trace 176 to form sixth TMR sensor element 50 (M2). In the layout depicted in FIG. 16, TMR sensor elements 50 of first and second arrays 170, 174 are adjacently located at center position 156.

Figure 17:
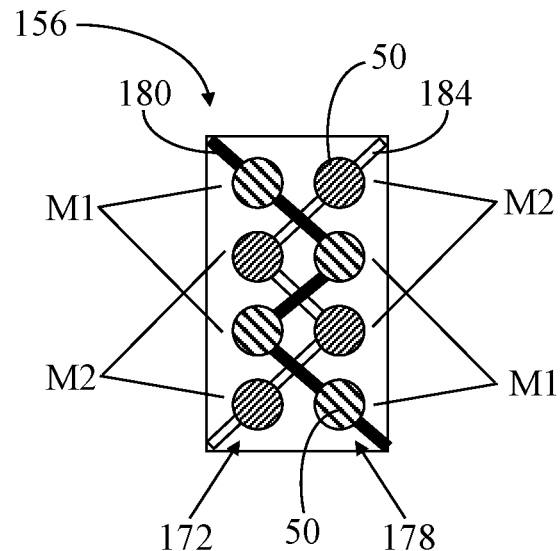
FIG. 17 shows a simplified top view of an arrangement of TMR sensor elements that may be located at the center position of the sensor die of FIG. 14 in accordance with another embodiment.

FIG. 17 shows a simplified top view of an arrangement of TMR sensor elements 50 that may be located at center position 156 of the sensor die 152 (FIG. 14) in accordance with another embodiment. In particular, TMR sensor elements 50 (represented by wide hatching) of a first array 178 of sensor elements are suitably electrically interconnected via a conductive trace 180 to form fifth TMR sensor element 50 (M1) and TMR sensor elements 50 (represented by narrow hatching) of a second array 182 of sensor elements are suitably electrically interconnected via a conductive trace 184 to form sixth TMR sensor element 50 (M2). In the layout depicted in FIG. 17, TMR sensor elements 50 of first and second arrays 178, 182 are arranged in an interleaved (i.e., alternating) configuration located at center position 156.

Figure 18:
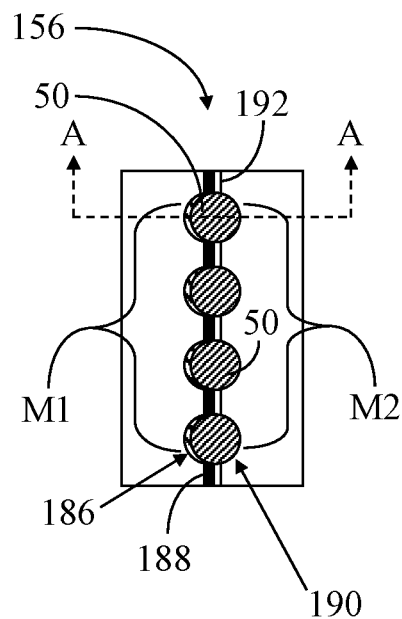
FIG. 18 shows a simplified top view of an arrangement of TMR sensor elements that may be located at the center position of the sensor die of FIG. 14 in accordance with yet another embodiment.
Figure 19:
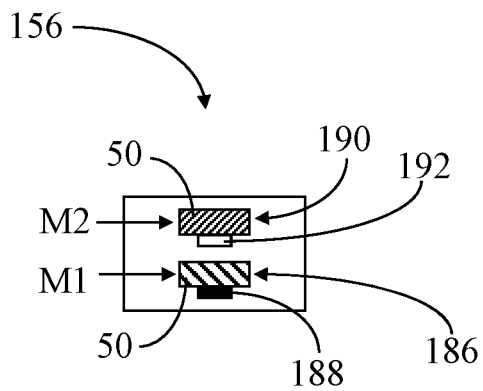
FIG. 19 shows a cross-sectional side view of the arrangement of TMR sensor elements along section line A-A of FIG. 18.

Referring to FIGS. 18-19, FIG. 18 shows a simplified top view of an arrangement of TMR sensor elements 50 that may be located at center position 156 of sensor die 152 (FIG. 14) in accordance with yet another embodiment and FIG. 19 shows a cross-sectional side view of the arrangement of TMR sensor elements 50 along section line A-A of FIG. 18. In particular, TMR sensor elements 50 (represented by wide hatching) of a first array 186 of sensor elements are suitably electrically interconnected via a conductive trace 188 to form fifth TMR sensor element 50 (M1) and TMR sensor elements 50 (represented by narrow hatching) of a second array 190 of sensor elements are suitably electrically interconnected via a conductive trace 192 to form sixth TMR sensor element 50 (M2). In the layout depicted in FIGS. 18 and 19, TMR sensor elements 50 of first and second arrays 186, 190 are arranged in a vertically stacked configuration within fabrication layers located at center position 156.

Although three configurations of TMR sensor elements 50 are described in connection with FIGS. 16-19, it should be understood that various quantities and arrangements of TMR sensor elements 50 that form fifth and sixth TMR sensor elements (e.g., M1 and M2) may alternatively be envisioned. Further, these alternative arrangements may combine the features described above, such as a stacked and interleaved arrangement. Additionally, the conductive traces in FIGS. 16-19 are shown as single lines for simplicity. However, it should be understood that the TMR sensor elements may have more than one conductive trace (e.g., to connect to top and bottom contacts of the sensor elements).

Figure 20:
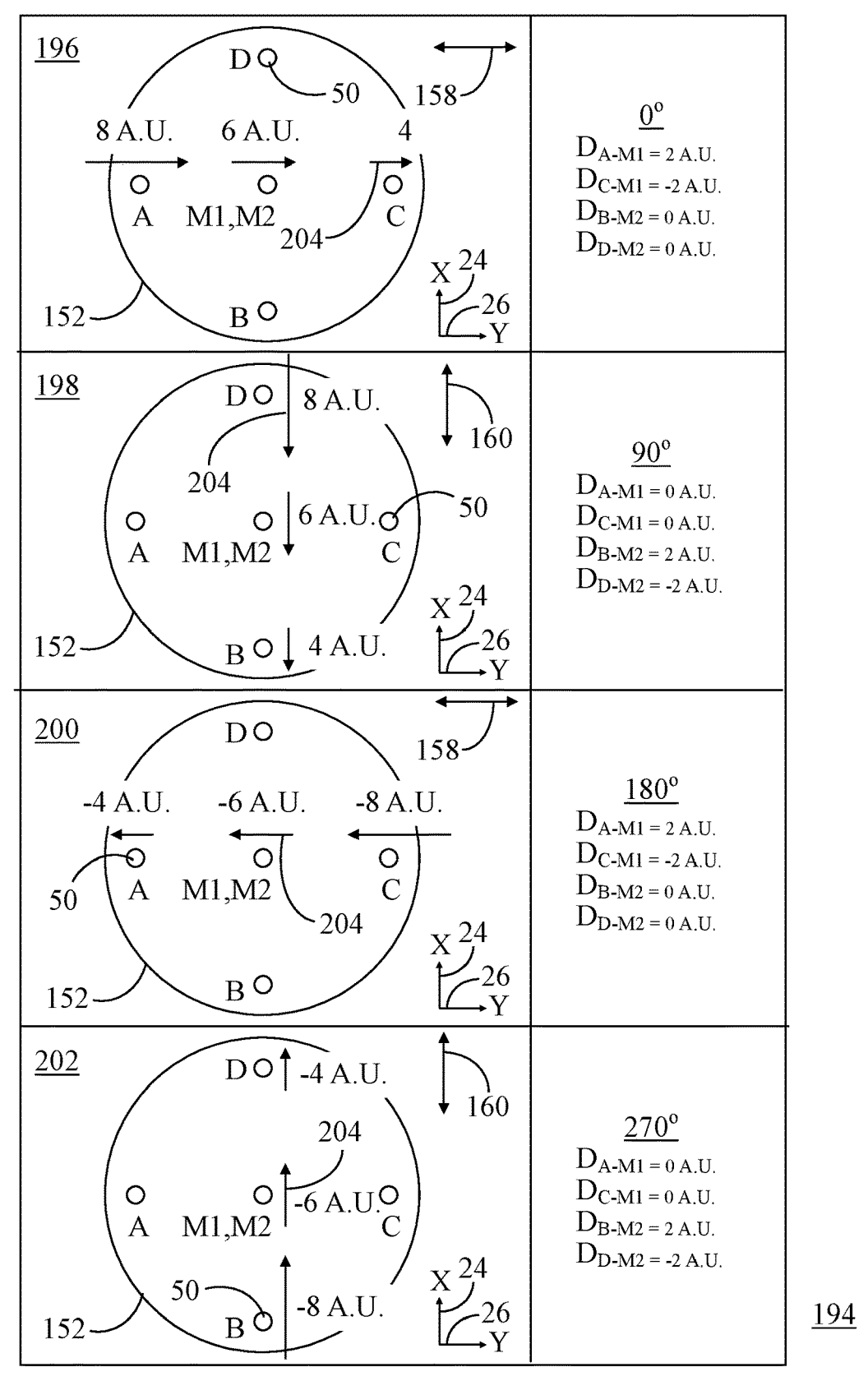

FIG. 20 shows a chart 194 depicting sensor die 152 in the presence of an encoder magnet having linear magnetic field distribution 82 (FIG. 5). For example, encoder magnet 142 (FIG. 13) of angular position measurement system 140 yields linear magnetic field distribution 82 instead of V-well shaped magnetic field distribution 94 (FIGS. 6 and 8). Thus, axis of rotation 146 (FIG. 13) is perpendicular to the sensing plane of TMR sensor elements 50. Again, it should be recalled that sensitive axis 158 of TMR sensor elements 50, labeled A, C, M1, is orthogonal to sensitive axis 160 of TMR sensor elements 50, labeled B, D, and M2. Chart 194 includes four subsections 196, 198, 200, 202 showing TMR sensor elements 50 subject to a magnetic field, represented by arrows 204, produced by an encoder magnet having linear magnetic field distribution 82. In this example, a direction of magnetic field is represented by the direction of arrows 204 and a magnetic field strength of the magnetic field is represented by the varying lengths of arrows 204. Hence, the magnetic field is referred to herein as magnetic field 204 which is characterized by both a direction and field strength.

In subsections 196 and 200, magnetic field 204 is oriented parallel to Y-axis 26. First, third, and fifth TMR sensor elements 50 (e.g., A, C, M1) are sensitive to magnetic field 204 aligned with Y-axis 26 and second, fourth, and sixth TMR sensor elements 50 (e.g., B, D, M2) are insensitive to magnetic field aligned with Y-axis 26. Therefore, only first, third, and fifth TMR sensor elements 50 (e.g., A, C, M1) will detect a magnetic field 204 that is oriented parallel to Y-axis 26. Conversely, in subsections 198 and 202, magnetic field 204 is oriented parallel to X-axis 24. First, third, and fifth TMR sensor elements 50 (e.g., A, C, M1) are insensitive to magnetic field 204 aligned with X-axis 24 and second, fourth, and sixth TMR sensor elements 50 (e.g., B, D, M2) are sensitive to magnetic field aligned with X-axis 24. Therefore, only second, fourth, and sixth TMR sensor elements 50 (e.g., B, D, M2) will detect a magnetic field 204 that is oriented parallel to X-axis 24.

In the gradient unit configuration of TMR sensor elements 50 described in connection with FIG. 15 and implemented in angular position measurement system 140 (FIG. 13), a rotation angle, φ, may be computed as presented below. For first gradient unit 162 (FIG. 15):

$$D_{A-M1} = \text{Out}A - \text{Out}M1 \tag{1}$$

For second gradient unit 164 (FIG. 15):

$$D_{C-M1} = \text{Out}C - \text{Out}M1 \tag{2}$$

For third gradient unit 166 (FIG. 15):

$$D_{B-M2} = \text{Out}B - \text{Out}M2 \tag{3}$$

For fourth gradient unit 168 (FIG. 15):

$$D_{D-M2} = \text{Out}D - \text{Out}M2 \tag{4}$$

The symbols OutA, OutB, OutC, OutD, OutM1, and OutM2 represent the output signal (e.g., the voltage response to magnetic field 204) of TMR sensor elements 50 (labeled A, B, C, D, M1, M2. The symbols $D_{A-M1}$, $D_{C-M1}$, $D_{B-M2}$, and $D_{D-M2}$ represent the differential signals between the output signals of TMR sensor elements 50 of corresponding first, second, third, and fourth gradient units 162, 164, 166, 168.

Through continued processing, elimination of homogeneous stray magnetic fields occurs as follows:

$$D_{A-M1} = \text{Out}A - \text{Out}M1$$

$$= S(H_A + O_Y) - S(H_{M1} + O_Y)$$

$$= S(H_A - H_{M1}) = S(\text{Grad}_{A-M1}) \tag{5}$$

$$D_{C-M1} = \text{Out}C - \text{Out}M1$$

$$= S(H_C + O_Y) - S(H_{M1} + O_Y)$$

$$= S(H_C - H_{M1}) = S(\text{Grad}_{C-M1}) \tag{6}$$

$$D_{B-M2} = \text{Out}B - \text{Out}M2$$

$$= S(H_B + O_X) - S(H_{M2} + O_X)$$

$$= S(H_B - H_{M2}) = S(\text{Grad}_{B-M2}) \tag{7}$$

$$D_{D-M2} = \text{Out}D - \text{Out}M2$$

$$= S(H_D + O_X) - S(H_{M2} + O_X)$$

$$= S(H_D - H_{M2}) = S(\text{Grad}_{D-M2}) \tag{8}$$

In equations (5)-(8), the output, Outi is a function of the sensitivity, S, of TMR sensor elements 50 (assumed to be equal for all sensor elements by, for example, design or linearization), the magnetic field strength, $H_i$, at the position of the TMR sensor element 50 and $O_Y$ and $O_X$, where "i" represents any of TMR sensor elements 50, labeled A, B, C, D, M1, and M2. $O_Y$ and $O_X$ represent a homogeneous stray magnetic field component along the sensing axis (e.g., either Y-axis 26 or X-axis 24). The differential signal depends upon the magnetic field gradient between two TMR sensor elements 50 of a gradient unit (e.g., any of first, second, third, and fourth gradient units 162, 164, 166, 168). Further, by implementing the gradient approach, it can be readily observed in equations (5)-(8) that the homogeneous stray magnetic field components, $O_Y$ and $O_X$, are canceled. Next, the differential signals may be summed, as follows:

$$\text{Sum}_{AC} = D_{A-M1} + |D_{C-M1}| = S(\text{Grad}_{A-M1}) + S(\text{Grad}_{C-M1}) \quad (9)$$

$$\text{Sum}_{DB} = D_{D-M2} + |D_{B-M2}| = S(\text{Grad}_{D-M2}) + S(\text{Grad}_{B-M2}) \quad (10)$$

The summation of the differential signals from multiple gradient units may increase the robustness of the system against mechanical offsets and generate a larger gradient signal to thereby improve the signal to noise ratio. Accordingly, computation of the rotation angle, φ, can be achieved as follows:

$$\varphi = \arctan \frac{\text{Sum}_{AC}}{\text{Sum}_{DB}} \quad (11)$$

Using the example presented in chart 194 of FIG. 20, it can be observed that in the presence of an encoder magnet that produces linear magnetic field distribution 82, in subsections 196 and 200, the gradient values (e.g., $D_{A-M1}$ and $D_{C-M1}$) at 0° are the same as those at 180°. Likewise, in subsections 198 and 202, the gradient values (e.g., $D_{B-M2}$ and $D_{D-M2}$) for 90° are the same as those at 270°. This leads to 180° periodicity. In other words, when angular position measurement system 140 implements an encoder magnet having linear magnetic field distribution 82 and sensor die 152 having multiple TMR sensor elements 50 arranged in a gradient configuration a measurement range of 0-180° may be achieved. Nevertheless, even in a gradient configuration having a measurement range of 0-180°, homogeneous stray magnet fields can be effectively suppressed as demonstrated in equations (1)-(11).

Figure 21:
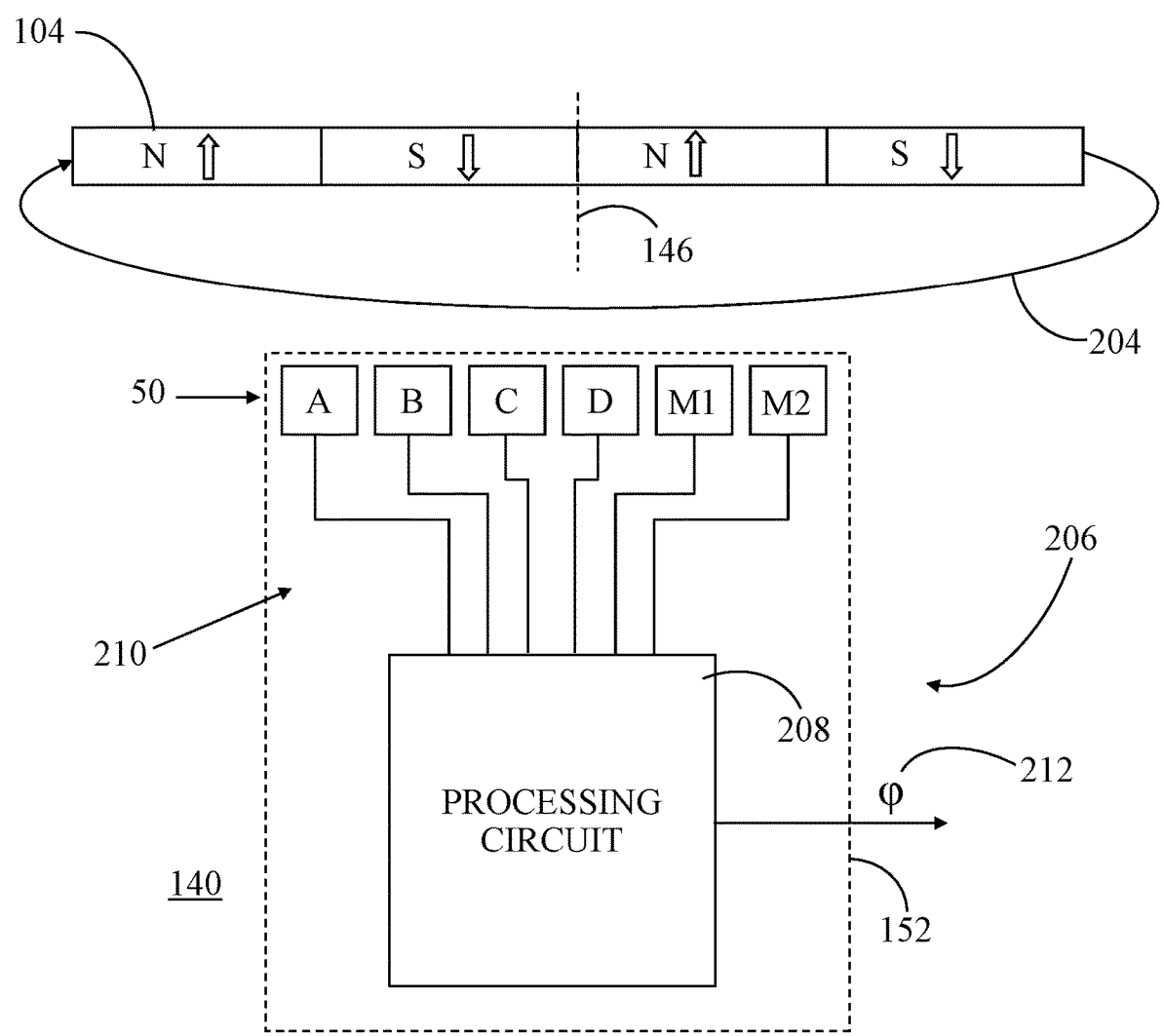
FIG. 21 shows a simplified block diagram of an angular position measurement system.

Referring now to FIG. 21, FIG. 21 shows a simplified block diagram of angular position measurement system 140 that may include an encoder magnet configured to generate V-well shaped magnetic field distribution 94 (FIG. 6). In some configurations, the encoder magnet may be circular encoder magnet 104, described in detail in connection with FIG. 10. In this example, system 140 includes sensor die 152. Sensor die 152 may include an application specific integrated circuit (ASIC) 206 and TMR sensor elements 50 may be fabricated on, or otherwise integrated with ASIC 206. Further, ASIC 206 with TMR sensor elements 50 may form at least part of the internal structure of a packaged magnetic field sensor (e.g., packaged magnetic field sensor 148 of FIG. 13).

ASIC 206 may implement, among other features, a processing circuit 208 that is customized to function with TMR sensor elements 50. Conductive pathways 210 interconnect each of TMR sensor elements 50 with processing circuit 208. Each of TMR sensor elements 50 is configured to produce an output signal in response to the changing magnetic field 204 produced by encoder magnet 104 when magnet 104 rotates about axis of rotation 146. Processing circuit 208 is configured to receive the output signals and suitably combine them to determine a rotation angle, φ, 212 for magnet 104, and hence for a rotating element (e.g., shaft 144 of FIG. 13). Further, this rotation angle 212 can be in a range of 0-360° as will be discussed below. In an example, processing circuit 208 may be suitably programmed to execute equations (1)-(11) presented above, although other computational techniques may alternatively be implemented.

TMR sensor elements 50 are shown in the block diagram as being arranged in a line for simplicity. However, in an actual configuration, TMR sensor elements 50, labeled A, B, C, D may be arranged along circular path 154 (FIG. 15) and TMR sensor elements 50, labeled M1 and M2 may be located at center position 156 (FIG. 15). Additionally, those skilled in the art will recognize that processing circuit 208 can encompass a wide variety of processing, control, or other structures. Further, although TMR sensor elements 50 are described herein as being integrated with ASIC 206, in other configurations TMR sensor elements 50 may be packaged separately from an ASIC that includes processing circuit 208. Therefore, in the interest of brevity and minimization of any risk of obscuring the principles and concepts of the various embodiments, further discussion of such structures, if any, will be limited to the essentials with respect to the principles and concepts of the various embodiments.

Figure 22:
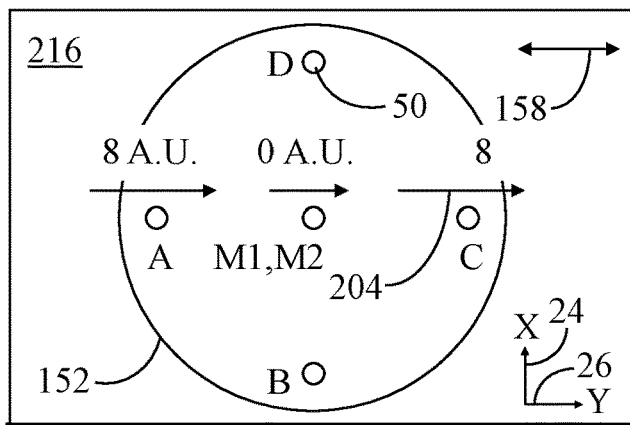
FIG. 22 shows a chart depicting the sensor die of FIG. 14 in the presence of an encoder magnet having the V-well shaped magnetic field distribution of FIGS. 6 and 8.

FIG. 22 shows a chart 214 depicting sensor die 152 in the presence of an encoder magnet having an x-axis mirror symmetric distribution (e.g., V-well shaped magnetic field distribution 94 of FIGS. 6 and 8), such as circular encoder magnet 104 depicted in FIG. 10 and in connection with the block diagram of angular position measurement system 140 of FIG. 21. Again, chart 214 includes four subsections 216, 218, 220, 222 showing TMR sensor elements 50 subject to magnetic field 204 produce by circular encoder magnet 104 having V-well shaped magnetic field distribution 94. Sensitive axis 158 of TMR sensor elements 50, labeled A, C, M1, is orthogonal to TMR sensor elements 50, labeled B, D, M2. The direction of magnetic field 204 is represented by the direction of the arrows and the magnetic field strength of magnetic field 204 is represented by the varying lengths of the arrows. The chosen field strength values are arbitrary for an x-axis mirror symmetric field distribution.

In subsections 216 and 220, magnetic field 204 is oriented parallel to Y-axis 26. First, third, and fifth TMR sensor elements 50 (e.g., A, C, M1) are sensitive to magnetic field 204 aligned with Y-axis 26 and second, fourth, and sixth TMR sensor elements 50 (e.g., B, D, M2) are insensitive to magnetic field aligned with Y-axis 26. Therefore, only first, third, and fifth TMR sensor elements 50 (e.g., A, C, M1) will detect magnetic field 204 that is oriented parallel to Y-axis 26. Conversely, in subsections 218 and 222, magnetic field 204 is oriented parallel to X-axis 24. First, third, and fifth TMR sensor elements 50 (e.g., A, C, M1) are insensitive to magnetic field 204 aligned with X-axis 24 and second, fourth, and sixth TMR sensor elements 50 (e.g., B, D, M2) are sensitive to magnetic field aligned with X-axis 24. Therefore, only second, fourth, and sixth TMR sensor elements 50 (e.g., B, D, M2) will detect a magnetic field 204 that is oriented parallel to X-axis 24.

In the gradient unit configuration of TMR sensor elements 50 described in connection with FIG. 15, rotation angle 212 (FIG. 21), φ, may be computed in accordance with equations (1)-(11). In contrast to chart 194 (FIG. 20) exemplifying gradients for an encoder magnet having linear magnetic field distribution 82 (FIG. 5), it can be observed that in the presence of an encoder magnet that produces V-well shaped magnetic field distribution 94, that in subsections 216 and 220, the gradient values (e.g., $D_{A-M1}$ and $D_{C-M1}$) at 0° are different from those at 180°. Likewise, in subsections 218 and 222, the gradient values (e.g., $D_{B-M2}$ and $D_{D-M2}$) for 90° are different from those at 270°. This leads to 360° periodicity. In other words, when angular position measurement system 140 implements an encoder magnet having V-well shaped magnetic field distribution 94 and sensor die 152 having multiple TMR sensor elements 50 arranged in a gradient configuration, a measurement range of 0-360° may be achieved. Additionally, homogeneous stray magnet fields can be effectively suppressed as demonstrated in equations (1)-(11).

Figure 23:
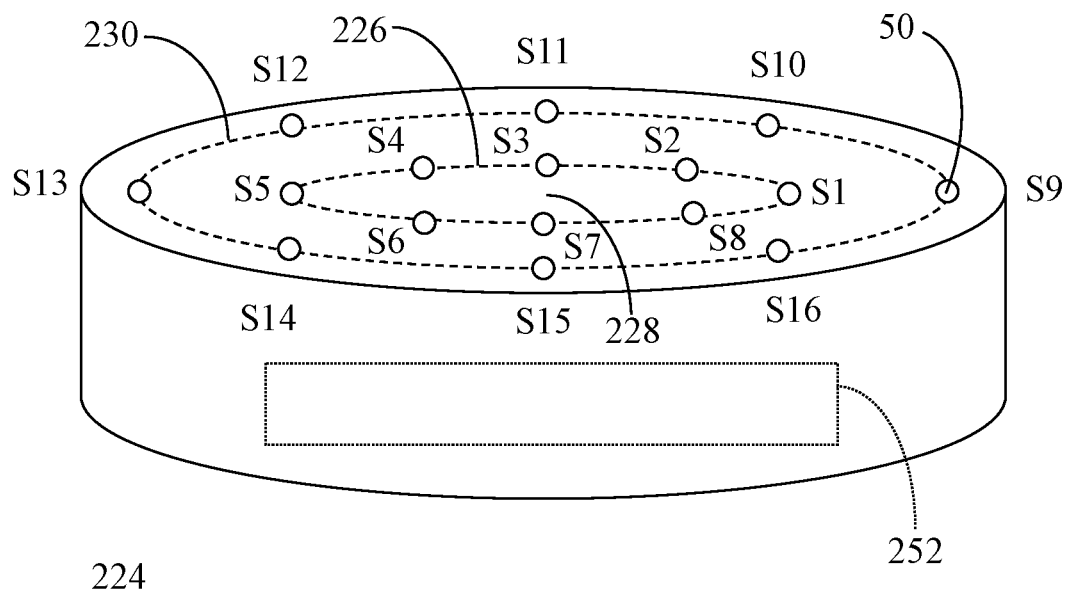
FIG. 23 shows a simplified perspective view of a sensor die having a plurality of TMR sensor elements in accordance with another embodiment.
Figure 24:
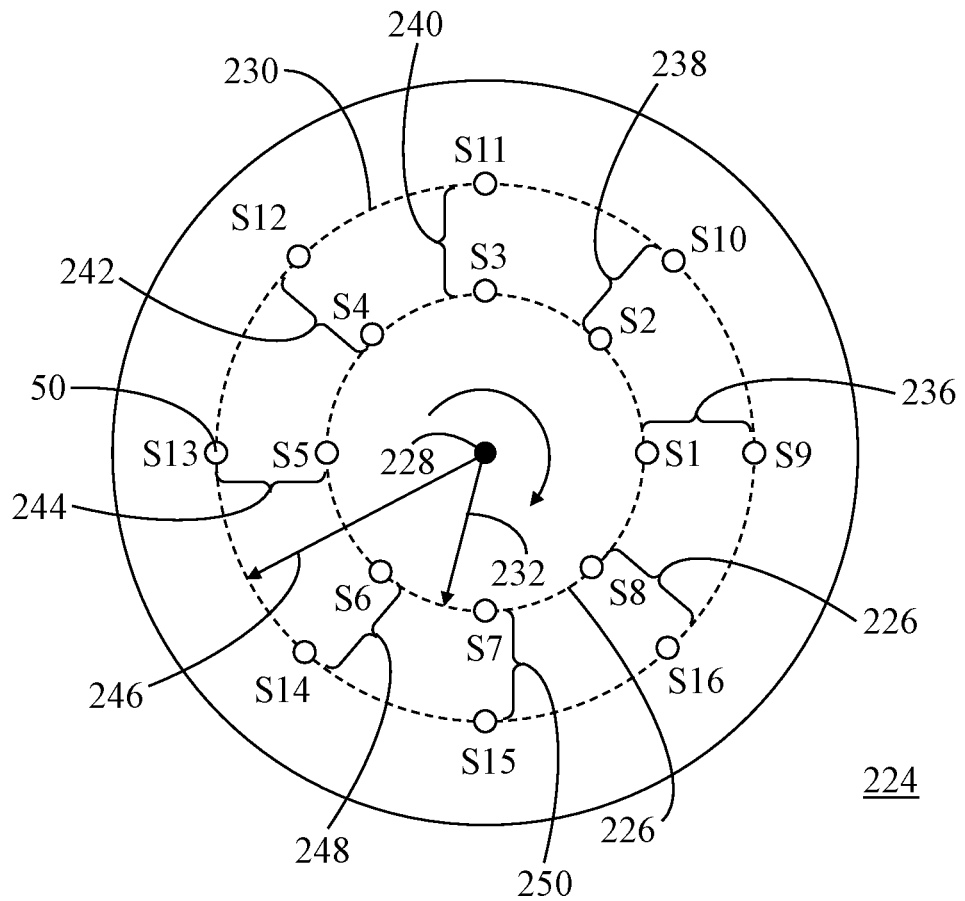
FIG. 24 shows a top view of the sensor die of FIG. 23.

With reference to FIGS. 23-24, FIG. 23 shows a simplified perspective view of a sensor die 224 having a plurality of TMR sensor elements 50 in accordance with another embodiment and FIG. 24 shows a top view of sensor die 224. Sensor die 224 may be incorporated in packaged magnetic field sensor 148 (FIG. 13) of angular position measurement system 140 (FIG. 13). TMR sensor elements 50, individually distinguished by S1, S2, S3, S4, S5, S6, S7, and S8, of a first set of sensor elements are arranged at multiple locations along a first circular path 226 having a center position 228 that is generally aligned with axis of rotation 146 (FIG. 13). TMR sensor elements 50, individually distinguished by S9, S10, S11, S12, S13, S14, S15, and S16, of a second set of sensor elements are arranged at multiple locations along a second circular path 230 that is also generally centered at position 228. First circular path 226 is characterized by a first radius 232 and second circular path 230 is characterized by a second radius 234 that is greater than first radius 232 of first circular path 226. Thus, sensor die 224 represents a double ring configuration of TMR sensor elements 50.

In some embodiments, TMR sensor elements 50 (e.g., S1 through S8) are equally spaced apart from one another by 45° along first circular path 226. Likewise, TMR sensor elements 50 (e.g., S9 through S16) are equally spaced apart from one another by 45° along second circular path 230. TMR sensor elements 50 (e.g., S1 through S8) may be radially aligned with corresponding ones of TMR sensor elements 50 (e.g., S9 through S16) to produce multiple sensors pairs in some embodiments. These sensor pairs form multiple gradient units. As best seen in FIG. 24, a first pair of TMR sensor elements 50 (e.g., S1 and S9) form a first gradient unit 236. A second pair of TMR sensor elements 50 (e.g., S2 and S10) form a second gradient unit 238. A third pair of TMR sensor elements 50 (e.g., S3 and S11) form a third gradient unit 240. A fourth pair of TMR sensor elements 50 (e.g., S4 and S12) form a fourth gradient unit 242. A fifth pair of TMR sensor elements 50 (e.g., S5 and S13) form a fifth gradient unit 244. A sixth pair of TMR sensor elements 50 (e.g., S6 and S14) form a sixth gradient unit 246. A seventh pair of TMR sensor elements 50 (e.g., S7 and S15) form a seventh gradient unit 248. And, an eight pair of TMR sensor elements 50 (e.g., S8 and S16) form an eighth gradient unit 250. Additionally, each of TMR sensor elements 50 (e.g., S1 through S16) may be a single sensor dot or they may be an array that may include multiple single sensor elements and dots, respectively.

Although sensor die 224 is depicted with eight sensor pairs, any suitable quantity (greater than two) pairs of TMR sensor elements 50 may be implemented. For a differing quantity of TMR sensor elements 50, the relative angle between adjacent TMR sensor elements 50 may be calculated by 360°/n, where "n" is equal to the number of sensor pairs. In other embodiments various angles may be used.

A processing circuit 252 (generally depicted by a dotted line box in FIG. 23) is electrically coupled to the first and second sets of TMR sensor elements 50 (e.g., S1 through S16) as discussed above in connection with FIG. 21. Processing circuit 252 is configured to produce differential output signals, each of the differential output signals being a difference between the output signals of the TMR sensor elements 50 of the sensor pair within each of gradient units 236, 238, 240, 242, 244, 246, 248, 250. In the gradient unit configuration of TMR sensor elements 50 described in connection with FIGS. 23-24, calculation of the differential output signal of each TMR sensor pair effectively cancels homogeneous stray magnetic fields, as derived above in connection with equations (1) through (8). The multiple differential output signals may be used for further signal processing to improve accuracy and mechanical offset robustness. In an example, to calculate the rotation angle, co, the following equations may be implemented at processing circuit 252:

$$D_{n-(n+8)} = \text{Out}_n - \text{Out}_{n+8} \tag{12}$$

In equation (12), $\text{Out}_n$ and $\text{Out}_{n+8}$, with n=1 through 8, represent the output signals (e.g. voltage response to the external magnetic field) of TMR sensor elements 50 (e.g., S1 through S16). Therefore, $D_{n-(n+8)}$, represents a differential output signal for a sensor pair for any of gradient units 236, 238, 240, 242, 244, 246, 248, 250. Thus, eliminating the homogeneous stray magnetic field components along the sense axes of TMR sensor elements 50 can be demonstrated as follows:

$$\text{Out}_n - \text{Out}_{n+8} = S(H_n + O) - S(H_{n+8} + O) = S(H_n - H_{n+8})$$

$$= S(\text{Grad}_{n-(n+8)}) \tag{13}$$

In equation (13), n=1 through 8, S is the sensitivity of TMR sensor elements 50 (assumed to be equal for all TMR sensor elements 50, e.g., by design or linearization), $H_n$ and $H_{n+8}$ represents the magnetic field strength at the position of the corresponding TMR sensor element 50, and O represents the homogeneous stray magnetic field component along the sensing axis. The differential output signal, $D_{n-(n+8)}$, thus depends upon the magnetic field gradient between two TMR sensor elements 50. Next the differential output signals may be summed, as follows:

$$\text{Sum}_{1,5} = D_{1-9} + D_{5-13} \tag{14}$$

$$\text{Sum}_{2,6} = D_{2-10} + D_{6-14} \tag{15}$$

$$\text{Sum}_{3,7} = D_{3-11} + D_{7-15} \tag{16}$$

$$\text{Sum}_{4,8} = D_{4-12} + D_{8-16} \tag{17}$$

In equations (14)-(17), the numbers 1-16 correspond to TMR sensor elements 50, labeled S1-S16 in FIGS. 23-24. Thus, in equation (14), $\text{Sum}_{1,5}$ represents the summation of the differential output signals of first and fifth gradient units 236, 244 in which $D_{1-9}$ represents the differential output signal of first gradient unit 236 and $D_{5-13}$ represents the differential output signal of fifth gradient unit 244. Similarly, in equation (15), $\text{Sum}_{2,6}$ represents the summation of the differential output signals of second and sixth gradient units 238, 246 in which $D_{2-10}$ represents the differential output signal of second gradient unit 238 and $D_{6-14}$ represents the differential output signal of sixth gradient unit 246. In equation (16), $\text{Sum}_{3,7}$ represents the summation of the differential output signals of third and seventh gradient units 240, 248 in which $D_{3-11}$ represents the differential output signal of third gradient unit 240 and $D_{7-15}$ represents the differential output signal of seventh gradient unit 248. In equation (17), $\text{Sum}_{4,8}$ represents the summation of the differential output signals of fourth and eighth gradient units 242, 250 in which $D_{4-12}$ represents the differential output signal of fourth gradient unit 242 and $D_{8-16}$ represents the differential output signal of eighth gradient unit 250.

Utilizing the summations of equations (14)-(17), two rotation angle calculations may be performed:

$$\varphi_1 = \arctan \frac{Sum_{1,5}}{Sum_{4,8}} \quad (18)$$

$$\varphi_2 = \arctan \frac{Sum_{5,6}}{Sum_{7,8}} \quad (19)$$

The measured rotation angle, φ, may be given by the average of the two rotation angles, $\varphi_1$ and $\varphi_2$ as follows:

$$\varphi = \frac{\varphi_1 + \varphi_2}{2} \quad (20)$$

Equations (1)-(11) provide one example for calculation of the rotation angle in the cross-type configuration of TMR sensor elements illustrated in FIGS. 14 and 15, and equations (12)-(20) provide one example for calculating the rotation angle in the double ring configuration of TMR sensor elements 50 illustrated in FIGS. 23-24. It should be understood, however, that alternative techniques may be implemented for calculating the rotation angle in the cross-type and double ring configurations of TMR sensor elements 50. Further, although cross-type and double ring configurations of TMR sensor elements 50 are illustrated herein, other suitable configurations of TMR sensor elements 50 may be implemented in alternative embodiments.

Figure 25:
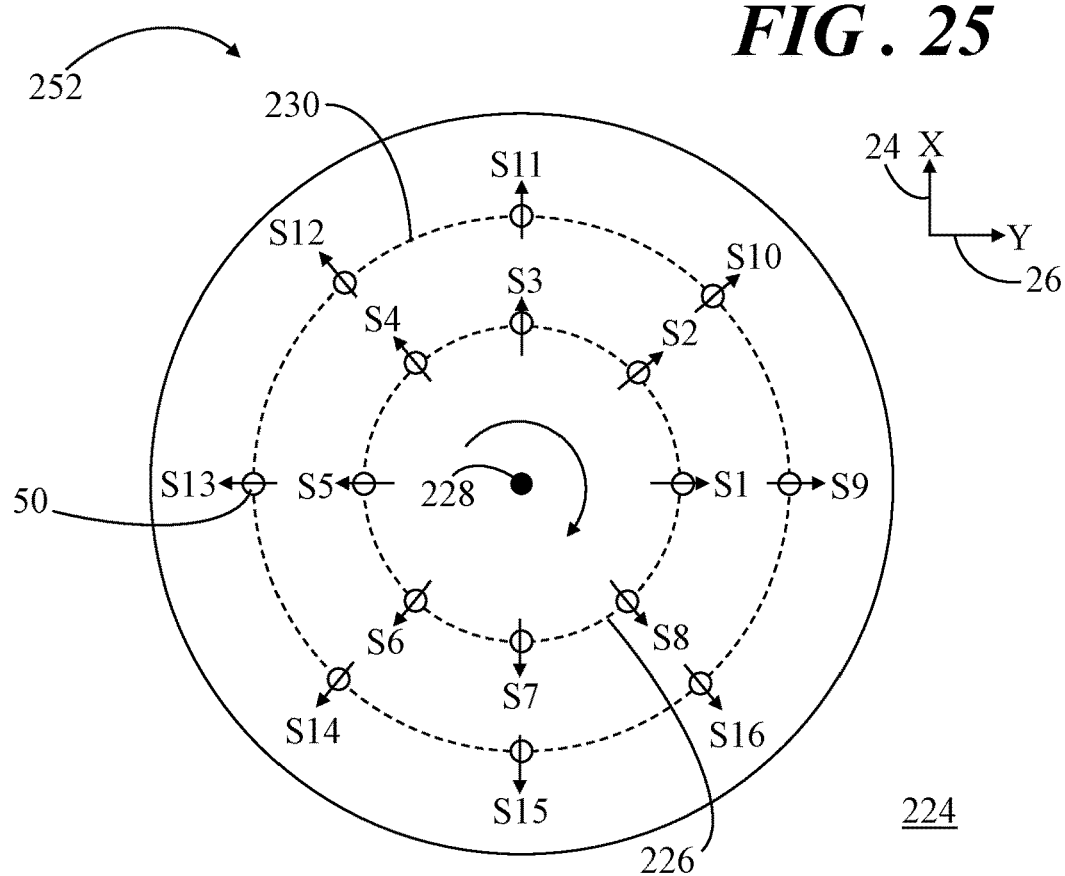
FIG. 25 shows a top view of the sensor die of FIG. 23 with an arrangement of the sensitive axes of the TMR sensor elements.

FIG. 25 shows a top view of sensor die 224 with an arrangement 252 of the sensitive axes of TMR sensor elements 50. It should be recalled that TMR sensor elements 50 having vortex magnetization pattern 62 (FIG. 3) are uniaxially sensitive. That is, TMR sensor elements 50 are sensitive to a magnetic field along a single axis. In arrangement 252, the sensitive axis orientation of TMR sensor elements 50 points outward from center position 228, as denoted by outwardly directed arrows.

Figure 26:
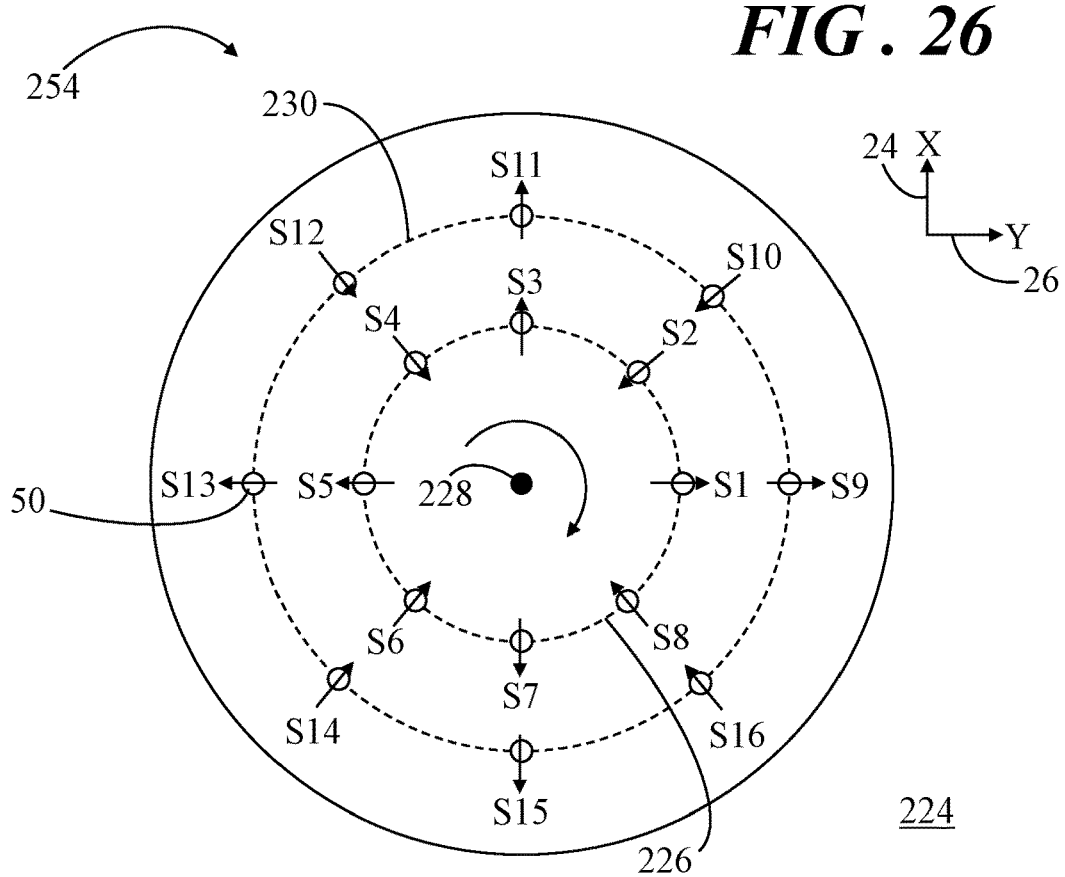
FIG. 26 shows a top view of the sensor die of FIG. 23 with another arrangement of the sensitive axes of the TMR sensor elements.

FIG. 26 shows a top view of sensor die 224 with another arrangement 254 of the sensitive axes of TMR sensor elements 50. In arrangement 254, TMR sensor elements 50 have the same sensitive axis orientation aligned along the diagonal. Thus, the sensitive axis orientation of TMR sensor elements 50, labeled S1, S3, S5, S7, S9, S11, S13, S15, points outward from center position 228, as denoted by outwardly directed arrows. Conversely, the sensitive axis orientation of TMR sensor elements 50, labeled S2, S4, S6, S8, S10, S12, S14, S16, points inward toward center position 228.

Figure 27:
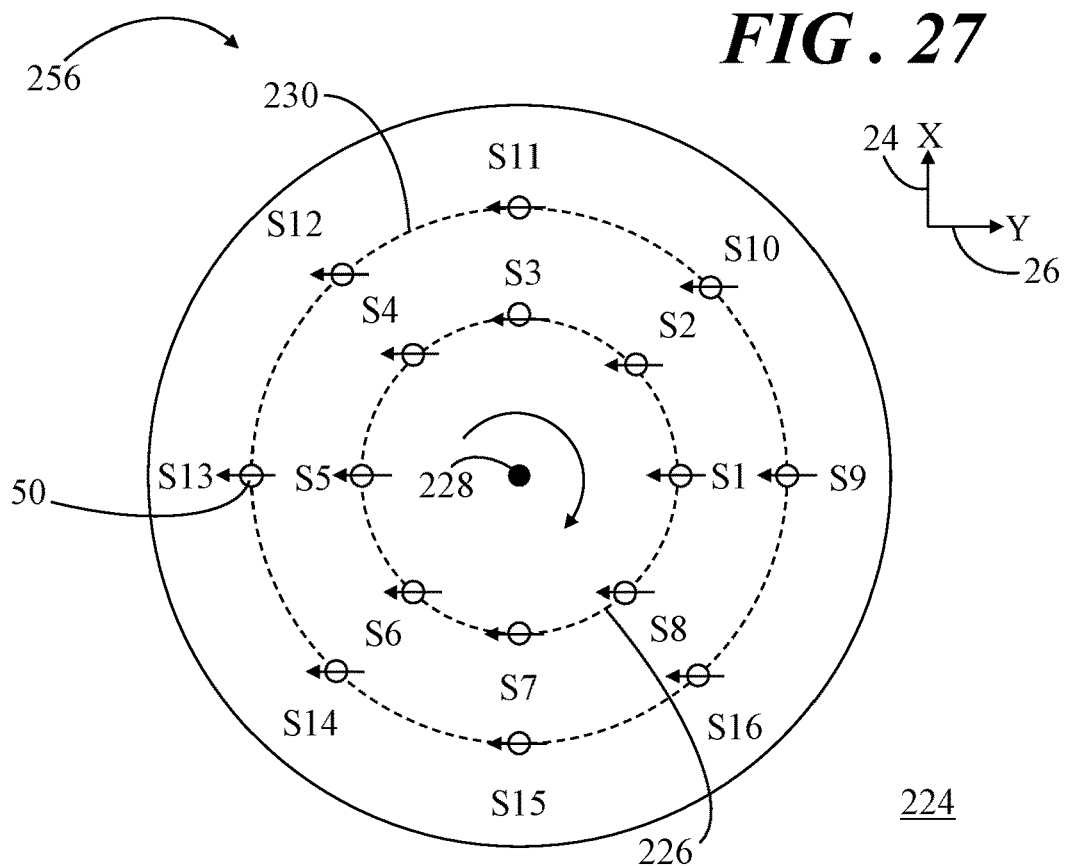
FIG. 27 shows a top view of the sensor die of FIG. 23 with another arrangement of the sensitive axes of the TMR sensor elements.

FIG. 27 shows a top view of sensor die 224 with another arrangement 256 of the sensitive axes of TMR sensor elements 50. In arrangement 256, all of TMR sensor elements 50 have them same sensitive axis orientation. In this example, the sensitive axis orientation is aligned with Y-axis 26, as denoted by leftward directed arrows.

Figure 28:
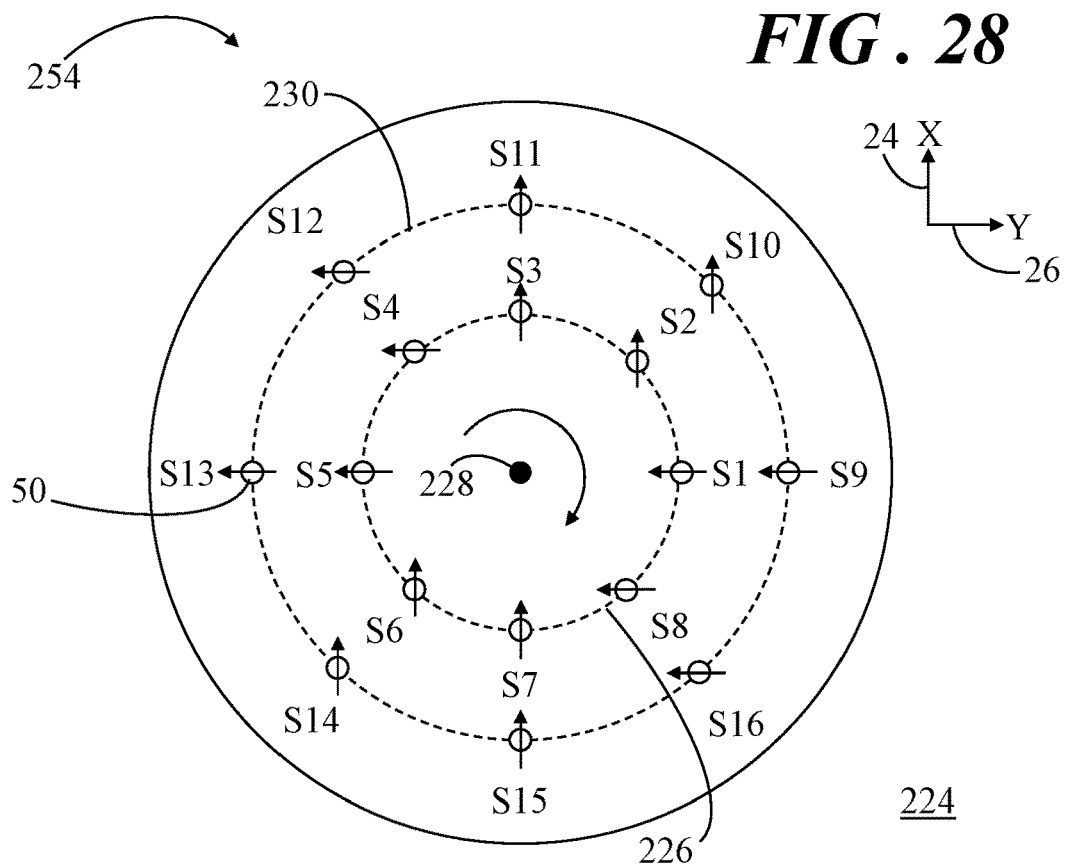
FIG. 28 shows a top view of the sensor die of FIG. 23 with another arrangement of the sensitive axes of the TMR sensor elements.

FIG. 28 shows a top view of sensor die 224 with another arrangement 258 of the sensitive axes of TMR sensor elements 50. In arrangement 258, the sensitive axis orientation is divided in two subsets, where the sensitive axis orientation of the two subsets is rotated 90° relative to one another. Thus, in this example, the sensitive axis orientation of TMR sensor elements 50, labeled S1, S4, S5, S8, S9, S12, S13, S16, is aligned with Y-axis 26, as denoted by leftward directed arrows, and the sensitive axis orientation of TMR sensor elements 50, labeled S2, S3, S6, S7, S10, S11, S14, S15, is aligned with X-axis 24, as denoted by upwardly directed arrows.

Arrangements 252, 254, 256, 258 of FIGS. 25-28 provide some examples of the sensitive axis orientation of TMR sensor elements 50 in the double ring configuration. It should be understood that other suitable arrangements for alignment of the sensitive axis orientation of TMR sensor elements 50 may alternatively be implemented.

Embodiments described herein entail systems and methodology for measuring angular rotation of an object. An embodiment of a system comprises a magnet having an axis of rotation, the magnet being configured to produce a magnetic field, and a plurality of magnetoresistive sensor elements, each of the magnetoresistive sensor elements having a magnetic free layer configured to generate a vortex magnetization pattern in the magnetic free layer, and the magnetoresistive sensor elements being configured to produce output signals in response to the magnetic field.

Another embodiment of a system comprises a magnet having an axis of rotation, the magnet being configured to produce a magnetic field having first and second in-plane magnetic field components arranged orthogonal to one another, the first in-plane magnetic field component having a V-well shaped magnetic field distribution, and the second in-plane magnetic field component having a substantially constant magnetic field distribution. The method further comprises a plurality of tunnel magnetoresistive (TMR) sensor elements, each of the TMR sensor elements having a magnetic free layer configured to generate a vortex magnetization pattern in the magnetic free layer, and the TMR sensor elements being configured to produce output signals in response to the magnetic field An embodiment of a method of determining a rotation angle of a rotating element comprises providing a magnet coupled to the rotating element, the magnet and rotating element being configured to rotate about an axis of rotation, the magnet being configured to produce a magnetic field having first and second in-plane magnetic field components arranged orthogonal to one another, the first in-plane magnetic field component having a V-well shaped magnetic field distribution, and the second in-plane magnetic field component having a substantially constant magnetic field distribution. The method further comprises producing a plurality of output signals in response to the magnetic field at each of a plurality of magnetoresistive sensor elements, each of the magnetoresistive sensor elements having a magnetic free layer configured to generate a vortex magnetization pattern in the magnetic free layer and determining the rotation angle using the plurality of output signals, the rotation angle having a range of 0-360° about the axis of rotation.

Thus, systems include multiple magnetoresistive sensor elements, such as tunnel magnetoresistive (TMR) sensor elements, arranged in a gradient magnetic field sensing configuration. The free layers of the TMR sensor elements are configured in a vortex domain state and are thus sensitive to in-plane magnetic fields along a single axis. A gradient bridge configuration of TMR sensor elements and the single axis sensitivity of the vortex-type TMR sensor elements can enable the suppression of the effect of homogeneous stray magnetic fields in an angular sensor application. Further, the system may include an encoder magnet magnetized to produce a V-well shaped magnetic field distribution to further differentiate the magnetic field signal of the encoder magnet from the homogeneous stray fields in order to yield highly accurate angular measurements over a 360° measurement range. Additionally, various arrangements of TMR sensor elements may further yield multiple differential signals for improved accuracy and robustness to mechanical offset.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A system comprising:
    a magnet having an axis of rotation, the magnet being configured to produce a magnetic field, wherein the magnet comprises alternating first and second linear sections oriented in a single direction relative to a surface of the magnet such that boundaries between all of the first and second linear sections are aligned parallel to one another, the first linear sections having a first magnetic field direction oriented perpendicular to the surface of the magnet, and the second linear sections having a second magnetic field direction oriented perpendicular to the surface of the magnet, the first and second magnetic field directions being directed opposite one another; and
    a plurality of magnetoresistive sensor elements, each of the magnetoresistive sensor elements having a magnetic free layer configured to generate a vortex magnetization pattern in the magnetic free layer, and the magnetoresistive sensor elements being configured to produce output signals in response to the magnetic field.

2. The system of claim 1 wherein the magnet is configured to produce the magnetic field having first and second in-plane magnetic field components arranged orthogonal to one another, the first in-plane magnetic field component having a V-well shaped magnetic field distribution.

3. The system of claim 2 wherein the magnet is further configured to produce the second in-plane magnetic field component having a substantially constant magnetic field distribution.

4. The system of claim 1 further comprising a processing circuit configured to receive the output signals from the magnetoresistive sensor elements and determine a rotation angle for the magnet using a plurality of output signals corresponding to the plurality of magnetoresistive sensor elements, the rotation angle having a range of 0-360° about the axis of rotation.

5. The system of claim 1 wherein the magnetoresistive sensor elements comprise tunnel magnetoresistive (TMR) sensor elements.

6. The system of claim 1 wherein the plurality of magnetoresistive sensor elements comprises:
    first, second, third, and fourth magnetoresistive sensor elements arranged at four locations along a circular path about the axis of rotation of the magnet, the first and third magnetoresistive sensor elements diametrically opposing one another along the circular path, and the second and fourth magnetoresistive sensor elements diametrically opposing one another along the circular path; and
    fifth and sixth magnetoresistive sensor elements arranged at a center position of the circular path, the first and fifth magnetoresistive sensor elements forming a first gradient unit, the third and fifth magnetoresistive sensor elements forming a second gradient unit, the second and sixth magnetoresistive sensor elements forming a third gradient unit, and the fourth and sixth magnetoresistive sensor elements forming a fourth gradient unit.

7. The system of claim 6 wherein the first, second, third, and fourth magnetoresistive sensor elements are equally spaced apart from one another about the circular path.

8. The system of claim 6 wherein the first, third, and fifth magnetoresistive sensor elements have a first sensitive axis that is rotated ninety degrees relative to a second sensitive axis of the second, fourth, and sixth magnetoresistive sensor elements.

9. The system of claim 6 wherein the fifth and sixth magnetoresistive sensor elements are arranged in a stacked, interleaved, or adjacent relationship at the center position of the circular path.

10. The system of claim 1 wherein the plurality of magnetoresistive sensor elements comprises:
    a first set of magnetoresistive sensor elements arranged at multiple locations along a first circular path about the axis of rotation of the magnet, the first circular path being characterized by a first radius; and
    a second set of magnetoresistive sensor elements arranged at multiple locations along a second circular path about the axis of rotation of the magnet, the second circular path being characterized by a second radius that is greater than the first radius.

11. The system of claim 10 wherein:
    the magnetoresistive sensor elements of the first set are equally spaced apart from one another about the first circular path; and
    the magnetoresistive sensor elements of the second set are equally spaced apart from one another about the second circular path.

12. The system of claim 10 wherein:
    the magnetoresistive sensor elements of the first set are radially aligned with corresponding ones of the magnetoresistive sensor elements of the second set to produce multiple sensor pairs, the multiple sensor pairs forming multiple gradient units; and
    the system further comprises a processing circuit electrically coupled to the first and second sets of magnetoresistive sensor elements, wherein the processing circuit is configured to produce differential output signals, each of the differential output signals being a difference between the output signals of the magnetoresistive sensor elements of the sensor pair within each gradient unit.

13. The system of claim 12 wherein for each of the gradient units, each of the magnetoresistive sensor elements of the sensor pair has the same sensitive axis.

14. A system comprising:
    a magnet having an axis of rotation, the magnet being configured to produce a magnetic field having first and second in-plane magnetic field components arranged orthogonal to one another, the first in-plane magnetic field component having a V-well shaped magnetic field distribution, and the second in-plane magnetic field component having a substantially constant magnetic field distribution, wherein the magnet comprises alternating first and second linear sections oriented in a single direction relative to a surface of the magnet such that boundaries between all of the first and second linear sections are aligned parallel to one another, the first linear sections having a first magnetic field direction oriented perpendicular to the surface of the magnet, and the second linear sections having a second magnetic field direction oriented perpendicular to the surface of the magnet, the first and second magnetic field directions being directed opposite one another; and a plurality of tunnel magnetoresistive (TMR) sensor elements, each of the TMR sensor elements having a magnetic free layer configured to generate a vortex magnetization pattern in the magnetic free layer, and the TMR sensor elements being configured to produce output signals in response to the magnetic field.

15. The system of claim 14 further comprising a processing circuit configured to receive the output signals from the TMR sensor elements and determine a rotation angle for the magnet using a plurality of output signals corresponding to the plurality of TMR sensor elements, the rotation angle having a range of 0-360° about the axis of rotation.

16. The system of claim 14 wherein the plurality of TMR sensor elements comprises:

first, second, third, and fourth TMR sensor elements arranged at four locations along a circular path about the axis of rotation of the magnet, the first and third TMR sensor elements diametrically opposing one another along the circular path, and the second and fourth TMR sensor elements diametrically opposing one another along the circular path; and fifth and sixth TMR sensor elements arranged at a center position of the circular path, the first and fifth TMR sensor elements forming a first gradient unit, the third and fifth TMR sensor elements forming a second gradient unit, the second and sixth TMR sensor elements forming a third gradient unit, and the fourth and sixth TMR sensor elements forming a fourth gradient unit.

17. The system of claim 14 wherein the plurality of TMR sensor elements comprises:

a first set of TMR sensor elements arranged at multiple locations along a first circular path about the axis of rotation of the magnet, the first circular path being characterized by a first radius; and a second set of TMR sensor elements arranged at multiple locations along a second circular path about the axis of rotation of the magnet, the second circular path being characterized by a second radius that is greater than the first radius, wherein the TMR sensor elements of the first set are radially aligned with corresponding ones of the TMR sensor elements of the second set to produce multiple sensor pairs, the multiple sensor pairs forming multiple gradient units.

18. A method of determining a rotation angle of a rotating element comprising:

providing a magnet coupled to the rotating element, the magnet and rotating element being configured to rotate about an axis of rotation, the magnet being configured to produce a magnetic field having first and second in-plane magnetic field components arranged orthogonal to one another, the first in-plane magnetic field component having a V-well shaped magnetic field distribution, and the second in-plane magnetic field component having a substantially constant magnetic field distribution, wherein the magnet comprises alternating first and second linear sections oriented in a single direction relative to a surface of the magnet such that boundaries between all of the first and second linear sections are aligned parallel to one another, the first linear sections having a first magnetic field direction oriented perpendicular to the surface of the magnet, and the second linear sections having a second magnetic field direction oriented perpendicular to the surface of the magnet, the first and second magnetic field directions being directed opposite one another;

producing a plurality of output signals in response to the magnetic field at each of a plurality of magnetoresistive sensor elements, each of the magnetoresistive sensor elements having a magnetic free layer configured to generate a vortex magnetization pattern in the magnetic free layer; and determining the rotation angle using the plurality of output signals, the rotation angle having a range of 0-360° about the axis of rotation.

* * * * *